United States Patent [19]

Veldhuis et al.

[11] Patent Number: 5,367,608
[45] Date of Patent: Nov. 22, 1994

[54] TRANSMITTER, ENCODING SYSTEM AND METHOD EMPLOYING USE OF A BIT ALLOCATION UNIT FOR SUBBAND CODING A DIGITAL SIGNAL

[75] Inventors: Raymond N. J. Veldhuis; Gerrit J. Keesman, both of Eindhoven, Netherlands

[73] Assignee: U.S. Philips Corporation, New York, N.Y.

[21] Appl. No.: 144,092

[22] Filed: Oct. 27, 1993

Related U.S. Application Data

[63] Continuation of Ser. No. 20,188, Feb. 16, 1993, abandoned, which is a continuation of Ser. No. 695,037, May 1, 1991, abandoned, which is a continuation-in-part of Ser. No. 620,971, Nov. 30, 1990, abandoned.

[30] Foreign Application Priority Data

May 14, 1990 [NL] Netherlands ............... 9001127

[51] Int. Cl.$^5$ ............. G10L 7/06; G10L 5/00
[52] U.S. Cl. ............... 395/2.38; 395/2.39; 395/2.12; 395/2.14
[58] Field of Search ............... 381/29–47; 395/2, 2.38, 2.39, 2.14, 2.12

[56] References Cited

U.S. PATENT DOCUMENTS

| | | | |
|---|---|---|---|
| 4,048,443 | 9/1977 | Crochiere et al. | |
| 4,455,649 | 6/1984 | Esteban et al. | 395/2.38 |
| 4,535,472 | 8/1985 | Tomcik | 395/2.38 |
| 4,811,398 | 3/1989 | Copperi | 395/2 |
| 4,896,362 | 1/1990 | Veldhuis et al. | 381/30 |
| 4,912,763 | 3/1990 | Galand et al. | 395/2.39 |
| 4,942,607 | 7/1990 | Schroder et al. | 395/2.12 |
| 4,972,484 | 11/1990 | Theile et al. | |
| 5,109,417 | 4/1992 | Fielder et al. | 381/36 |
| 5,142,656 | 8/1992 | Fielder et al. | 381/37 |
| 5,214,678 | 5/1993 | Rault et al. | 395/2.13 |

FOREIGN PATENT DOCUMENTS 3440613 of 0000 Germany.

OTHER PUBLICATIONS

Concise Explanation of the Relevance of German Patent No 34 40 613 C1.
"Digital Communications" Bernard Sklar, Prentice Hall, 1988, pp. 72–73.
EBU Techn. Review, No. 230, Aug. 1988, G. Theile et al. "Low Bit Rate Coding of High–Quality Audio Signal. An Introduction to the Mascam System".
Philips Journal of Research 44, 329–343, 1989, R. N. J. Veldhuis et al. "Subband Coding of Digital Audio Signals".
IEEE ICASSP 80, vol. 1, pp. 327–331, Apr. 9–11, 1980 M. A. Krasner "The Critical Band Coder—Digital Encoding of Speech Signals Based on the Perceptual Requirements of the Auditory System".

*Primary Examiner*—David D. Knepper
*Attorney, Agent, or Firm*—Richard A. Weiss

[57] ABSTRACT

Transmitter, encoding system and method for subband coding a digital signal. The encoding system includes a splitter unit for dividing the digital signal into subband signals $SB_1, \ldots, SB_p$; a quantizer unit for quantizing time-equivalent q sample signal blocks of the subband signals; a bit need determining unit and a bit allocation unit. The bit need determining unit determines a bit need $b_m$ which corresponds to the number of bits by which the q samples in a time-equivalent signal block in a subband signal $SB_m$ should be represented, where $1 \leq m \leq P$. The bit allocation unit allocates $n_m$ bits to each of the q samples of the time-equivalent signal block of subband signal $SB_m$ on the basis of the bit need $b_m$ and an available bit quantity B, $n_m$ being the number of bits by which the q samples in the time-equivalent signal block of subband signal $SB_m$ will be represented, where $1 \leq m \leq P$.

58 Claims, 9 Drawing Sheets

| $n_k = A_{k0}$ | $n_l = A_{l0}$ | | | |
|---|---|---|---|---|
| $b_k = b_k - A_{k1}$ | $b_l = b_l - A_{l1}$ | ----- | $b_f = \text{FLAGVALUE}$ | ---- |
| $B = B - A_{k0}q - x$ | $B = B - A_{l0}q - x$ | | | |

FIG.6

| $k_1$-$k_2$ | T(...) | $k_1$-$k_2$ | T(...) | $k_1$-$k_2$ | T(...) | $k_1$-$k_2$ | T(...) | $k_1$-$k_2$ | T(...) | $k_1$-$k_2$ | T(...) |
|---|---|---|---|---|---|---|---|---|---|---|---|
| 0 | 16 | 15 | 10 | 30 | 6 | 45 | 3 | 60 | 2 | 75 | 1 |
| 1 | 16 | 16 | 9 | 31 | 5 | 46 | 3 | 61 | 2 | 76 | 1 |
| 2 | 15 | 17 | 9 | 32 | 5 | 47 | 3 | 62 | 2 | 77 | 1 |
| 3 | 15 | 18 | 9 | 33 | 5 | 48 | 3 | 63 | 1 | 78 | 1 |
| 4 | 14 | 19 | 8 | 34 | 5 | 49 | 3 | 64 | 1 | 79 | 1 |
| 5 | 14 | 20 | 8 | 35 | 5 | 50 | 3 | 65 | 1 | 80 | 1 |
| 6 | 13 | 21 | 8 | 36 | 4 | 51 | 2 | 66 | 1 | 81 | 1 |
| 7 | 13 | 22 | 8 | 37 | 4 | 52 | 2 | 67 | 1 | 82 | 1 |
| 8 | 12 | 23 | 7 | 38 | 4 | 53 | 2 | 68 | 1 | 83 | 1 |
| 9 | 12 | 24 | 7 | 39 | 4 | 54 | 2 | 69 | 1 | 84 | 1 |
| 10 | 12 | 25 | 7 | 40 | 4 | 55 | 2 | 70 | 1 | 85 | 1 |
| 11 | 11 | 26 | 6 | 41 | 4 | 56 | 2 | 71 | 1 | 86 | 1 |
| 12 | 11 | 27 | 6 | 42 | 3 | 57 | 2 | 72 | 1 | 87 | 1 |
| 13 | 10 | 28 | 6 | 43 | 3 | 58 | 2 | 73 | 1 | 88 | 1 |
| 14 | 10 | 29 | 6 | 44 | 3 | 59 | 2 | 74 | 1 | 89 | 0 |

FIG.7

TRANSMITTER, ENCODING SYSTEM AND METHOD EMPLOYING USE OF A BIT ALLOCATION UNIT FOR SUBBAND CODING A DIGITAL SIGNAL

This is a continuation of application Ser. No. 08/020,188, filed Feb. 16, 1993 and now abandoned, which is a continuation of application Ser. No. 07/695,037, filed May 1, 1991 and now abandoned, which is a continuation-in-part of application Ser. No. 07/620,971, filed Nov. 30, 1990 and now abandoned.

BACKGROUND OF THE INVENTION

The present invention relates to an encoding system for subband coding of a wideband digital signal, for example, a digital signal having a specific sampling frequency $F_S$. The encoding system comprises: (a) a splitter unit which divides the bandwidth of the wideband digital signal into M successive subbands which augment with frequency, and generates, in response to the wideband digital signal, P subband signals with sampling frequency reduction, each of the subband signals being associated with one of the subbands; (b) a quantizer unit for quantizing block-by-block the respective subband signals, a subband signal $SB_m$ of the subband signals being composed of successive signal blocks, each signal block comprising q samples, the q samples in a quantized signal block of subband signal $SB_m$ each being represented by $n_m$ bits; (c) a bit need determining unit for determining bit needs for corresponding (i.e., time-equivalent) signal blocks of the subband signals, a signal block of subband signal $SB_m$ having a bit need $b_m$ which is related to the number of bits by which the q samples in that signal block should be represented; and (d) a bit allocation unit for allocating bits from an available quantity of bits B to the samples in the time-equivalent signal blocks of the subband signals in response to the bit needs determined by the bit need determining unit, such allocation establishing the value of $n_m$; where $1 \leq m \leq P$. The encoding system may further comprise a formatting circuit for assembling the quantized samples of the time-equivalent signal blocks to form an output signal having successive frames and including scale factor information in each frame, which scale factor information comprises x-bit words, an x-bit word representing a scale factor associated with the samples in a signal block. The present invention also relates to a transmitter comprising such an encoding system. An encoding system of the aforesaid type is known from U.S. Pat. No. 4,896,362.

Subband encoding of a single signal, such as a mono audio signal or a left or right signal portion of a stereo signal, may be desired. In that case P, the number of subband signals equals M, the number of subbands. In each subband, the splitter unit then generates one subband signal. However, such encoding may also involve a stereo signal. In that case, it holds that P equals 2M. The splitter unit then generates two subband signals in each subband, i.e., a left and a right subband signal.

SUMMARY OF THE INVENTION

The invention in particular relates to the bit allocation unit for allocating bits to the various signal blocks on the basis of the bit needs $b_1$ to $b_P$ for corresponding (i.e., time-equivalent) signal blocks of the subband signals $SB_1$ to $SB_P$ in the subbands taken from 1 to M, and a certain number of bits B to be allocated thereto. The number of bits used in each subband signal for quantizing the samples in the signal blocks is variable with time in order to achieve the highest possible perceptual quality.

The invention also provides a method of allocating the available bits to the quantizers according to a specific criterion. For this purpose, the encoding system according to the invention is characterized in that on the basis of the bit needs $b_1$ to $b_P$ of corresponding signal blocks of the subband signals $SB_1$ to $SB_P$ in the subbands 1 to M as determined in the bit need determining unit, the bit allocation unit performs the following operations in a specific routine $S_1$, which routine is performed at least twice:

(a) determining $b_j$, which is the largest of the bit needs $b_1$ to $b_P$;

(b) establishing whether bits have previously been allocated to the signal block j having the bit need $b_j$; and (c) if they have not, then allocating a value $a_1$ to $n_j$, when $n_j$ is the number of bits to be allocated per sample in signal block j; subtracting a value $a_2$ from $b_j$; and subtracting the value $a_1 \cdot q + x$ from B; or (d) if they have, then adding the value $c_1$ to $n_j$; subtracting the value $c_2$ from $b_j$; subtracting the value $c_1 \cdot q$ from B.

In the foregoing, q and x are integers greater than unity, $n_m$ and $b_m$ are variables where $n_m$ is greater than or equal to zero, $a_1$, $a_2$, $c_1$ and $c_2$ are numbers greater than zero, B is an integer greater than zero, m is a variable integer, $a_1$ is greater than $c_1$ and $a_2$ is greater than or equal to $c_2$.

From Philips Journal of Research, Vol. 44, 329–343, 1989, a method is known which is very similar to the method proposed herein, compare especially, section 5, "Adaptive bit allocation", in that document. However, after the maximum bit need $b_j$ is determined, the value $n_j$ is raised by unity in all cases. Contrary to that method, a distinction is made according to the present invention for the situation in which bits are allocated for the first time to a signal block j ($n_j = 0$). In this case, $n_j$ is assumed to be equal to $a_1$, whereas if bits have already been allocated to the signal block j at an earlier instant ($n_j > 0$), $n_j$ is raised by $c_1$, where $a_1 > c_1$. For example, $a_1$ is equal to 2 and $c_1$, for example, is equal to 1. In a first bit allocation to a signal block, more bits are allocated to each sample than with a second or subsequent bit allocation. Research has shown that a bit allocation as proposed by the present invention leads to a better encoding of a digital signal, so that the reconstructed digital signal has a better quality after decoding.

The encoding system may further be characterized in that the bit allocation unit is arranged for carrying out the following operations in a routine $S_0$ prior to the routine $S_1$, for a signal block k of a subband signal in a subband:

allocating a value $A_{k0}$ to $n_k$;

subtracting a value $A_{k1}$ from $b_k$; and subtracting a value $A_{k0} \cdot q + x$ from B; in that $A_{k0}$ and $A_{k1}$ are numbers greater than zero.

In routine $S_0$, bits are allocated to a signal block of a subband signal in a subband which is to be quantized by more than zero whatever its bit need. The reason for this is that sometimes subband signals cannot readily be switched off. Doing so could produce audible effects.

The encoding system may further be characterized in that the bit allocation unit is arranged for allocating a flag value in the routine $S_0$ to a signal block of one or more subband signals in one or more subbands, which flag value indicates that no bits are to be allocated to the signal block concerned. In this respect, it, thus, holds that some subbands must not be switched on because this also could produce audible effects.

BRIEF DESCRIPTION OF THE DRAWINGS

The invention will be further explained in the following descriptions with reference to a number of exemplary embodiments, in which:

FIG. 6 shows the initial bit allocation;

FIG. 7 shows the correction Table to be used for number additions utilizing a logarithmic representation of the numbers;

DESCRIPTION OF THE PREFERRED EMBODIMENTS

Figures 1, 1A:
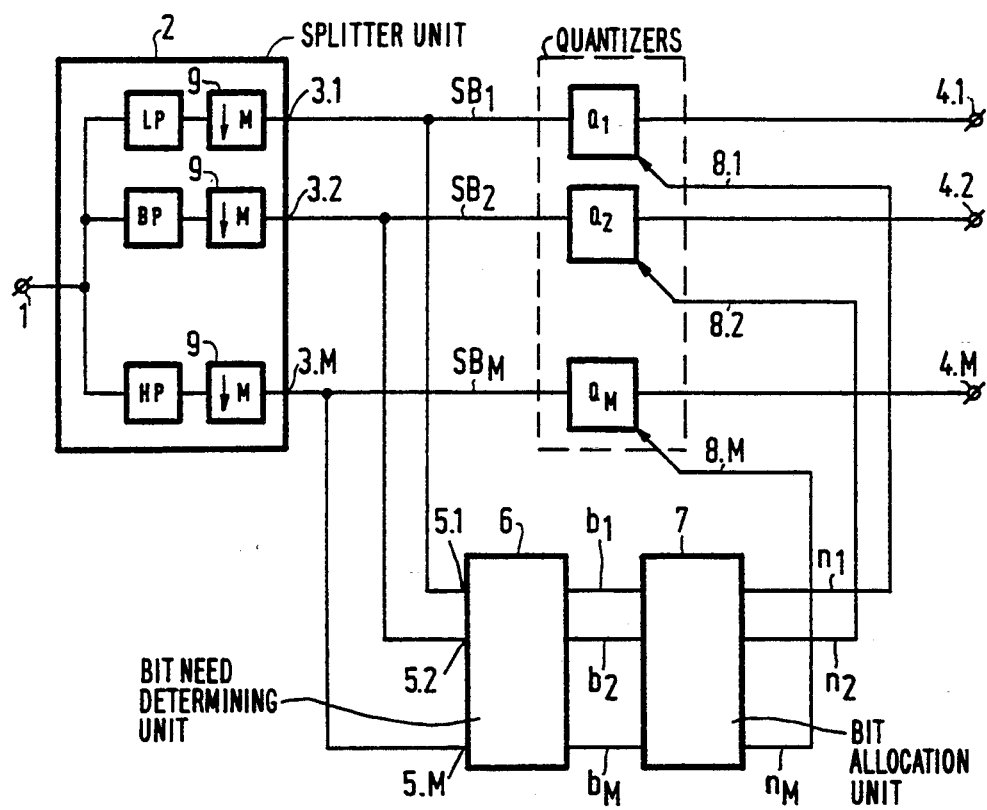
FIG. 1 shows an encoding system according to the invention.
FIG. 1a shows the corresponding (i.e., time-equivalent) signal blocks in the subband signals $SB_1$ to $SB_P$, where P=M, each signal block comprising q samples.

The description of the system in the drawings will relate to subband encoding of a single digital signal. That is to say, subband encoding of a mono audio signal of only the right or left signal portion of a stereo audio signal. As already observed above, this means that P equals M and that in each subband there is only one subband signal present. At the end of this description is an explanation of how the bit need and bit allocation information may be determined in case of subband encoding of a stereo signal, it being understood that in that case P equals 2M and so there will be two subband signals in each subband.

FIG. 1 shows an encoding system according to the invention. A wideband digital signal is applied to input terminal 1, such as a digitally sampled audio signal having a bandwidth of approximately 20 kHz. Input 1 receives the samples of the digital audio signal having, for example, a sampling frequency of 44 kHz, each sample being, for example, 16 bits. The signal is applied to a splitter unit 2 which comprises M signal filters. The splitter unit 2 distributes the digital signal over M subbands by means of the M filters, that is to say, a low-pass filter LP, M-2 band-pass filters BP and a high-pass filter HP, for example. M is, for example, equal to 32. The sampling frequency of the M subband signals is reduced in the blocks referenced 9. In those blocks, the sampling frequency is reduced by a factor M. The signals, thus, obtained are available at the outputs 3.1, 3.2, ..., 3.M. At the output 3.1, a signal $SB_1$ is available in the lowest subband 1. At the output 3.2, a signal $SB_2$ is available in the next lowest subband 2. At the output 3.M, a signal $SB_M$ is available in the highest subband M. The subband signals $SB_1$ to $SB_M$ at the outputs 3.1 to 3.M each include successive samples, each sample being expressed in numbers of 16 bits or over, for example 24 bits. In the exemplary embodiment of the invention under discussion, the subbands 1 to M all have the same width. This is not a necessity, however.

In a publication, by M. A. Krasner, entitled "The Critical Band Coder—Digital Encoding of Speech Signals Base on the Perceptual Requirements of the Auditory System" in IEEE ICASSP 80, Vol. 1, pp. 327–331, Apr. 9–11, 1980 a subdivision into a plurality of subbands is provided whose bandwidths approximately correspond to the bandwidths of the critical bands of the human auditory system in the respective frequency areas.

The operation of the splitter unit 2 will not further be explained since the operation of such a unit has already been described extensively hereinbefore. For this purpose, reference is made to the above-mentioned Krasner publication and U.S. Pat. Nos. 4,896,362 and 5,214,678 which are incorporated herein by reference.

The samples in each subband signal are grouped as successive signal blocks of q successive samples, for example q may be equal to 12, see FIG. 1a, and are applied to corresponding quantizers $Q_1$ to $Q_M$. In a quantizer $Q_m$, the samples of a signal block are quantized to obtain quantized samples, each quantized sample having a number of bits $n_m$ which is smaller than 16.

Figure 2:
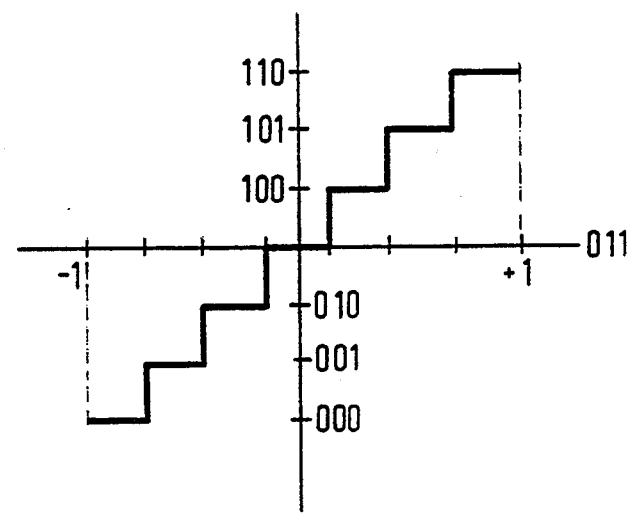
FIG. 2 shows the quantization to a three-bit binary representation.

FIG. 2 shows quantization using a 3-bit binary representation. During the process of quantization, the q samples in each of the signal blocks (groups) of the subband signals are each normalized and then quantized using a number of bits, 3 in the example of FIG. 2. Normalization is performed by dividing the amplitudes of the q samples by the amplitude of the sample having the largest absolute value in the signal block. The amplitude of the sample having the largest amplitude in a signal block of subband signal $SB_m$ yields the scale factor $SF_m$ for that signal block (see copending U.S. patent application Ser. No. 07/997,158 filed Dec. 21, 1992 and incorporated herein by reference). Subsequently, the amplitudes of the normalized samples, which are now situated in an amplitude range from $-1$ to $+1$, are quantized according to FIG. 2.

This implies that normalized samples in the amplitude range between $-1$ and $-0.71$ are quantized with the 3-bit number 000, and that: samples in the amplitude range from $-0.71$ to 0.42 are quantized with 001, samples in the amplitude range from 0.42 to 0.14 are quantized with 010, samples in the amplitude range from $-0.14$ to 0.14 are quantized with 001, samples in the amplitude range from 0.14 to 0.42 are quantized with 100, samples in the amplitude range from 0.42 to 0.71 are quantized with 101, and samples in the amplitude range from 0.71 to 1.00 are quantized with 110. In copending application Ser. No. 07/997,158, mentioned above, three-bit quantization is extensively discussed (see FIGS. 24, 25 and 26 and the relevant descriptions in that document).

The quantized samples in the subband signals $SB_1$ to $SB_M$ are thereafter available at the respective outputs 4.1 to 4.M see FIG. 1. Furthermore, the outputs 3.1 to 3.M of splitter unit 2 are coupled to the respective inputs 5.1 to 5.M of bit need determining unit 6. The bit need determining unit 6 determines the bit need $b_m$ for the corresponding (i.e., time-equivalent) signal blocks of q samples of the subband signals $SB_1$ to $SB_M$. The bit need $b_m$ is a number related to the number of bits with which each of the q samples in a signal block in a subband signal should be quantized.

The bit needs $b_1$ to $b_M$, derived by the bit need determining unit 6, are applied to bit allocation unit 7. The bit allocation unit 7 determines the actual number of bits $n_1$ to $n_M$ with which the q samples of the corresponding signal blocks in the subband signals $SB_1$ to $SB_M$ are to be quantized. Control signals corresponding to the numbers $n_1$ to $n_M$ are applied to the respective quantizers $Q_1$ to $Q_M$ through lines 8.1 to 8.M, so that the quantizers can quantize the samples with the correct number of bits.

The following will provide an explanation of the operation of the bit need determining unit 6 and the bit allocation unit 7. The bit needs for the time-equivalent signal blocks of q samples in each of the subband signals $SB_1$ to $SB_M$ are derived from estimates of the power $v_m$ and the scale factor $SF_m$ of the signal block in the subband signal $SB_m$.

The power $v_m$ may, for example, be estimated by means of the following formula:

$$v_m = \frac{1}{q} \sum_{i=1}^{q} s_i^2 \qquad \text{EQ (1)}$$

where $s_i$ is the amplitude of the $i^{th}$ sample in the q-sample signal block of the subband signal $SB_m$. The scale factor $SF_m$ is equal to the amplitude of the sample in the signal block having the largest absolute value, as has already been observed hereinbefore. It should be observed in this context that the estimate for the power $v_m$ in a signal block of the subband signal $SB_m$ also might have been obtained by assuming that $v_m$ was equal to the squared scale factor $SF_m$.

For all corresponding signal blocks in the subband signals $SB_1$ to $SB_M$, the power $v_m$ and the scale factor $SF_m$ are determined in this fashion. The powers are ordered as a vector $\{v\}$. By multiplying the vector $\{v\}$ by an $M \times M$ matrix $[D]$, one will obtain a vector $\{w\}$ from the following formula:

$$\{w\} = [D]\{v\} + \{w_r\} \qquad \text{EQ. (2)}$$

In this formula, $[D]$ is a matrix whose coefficients $d_{ij}$ denote the coefficient by which the power $v_j$ of the q-sample signal block of the subband signal $SB_j$ is to be multiplied to calculate the masked power in the subband i for subband signal $SB_i$ due to the signal in the q-sample signal block of the subband signal $SB_j$, and $w_{r,i}$ is the coefficient in the vector $\{w_r\}$ which denotes the masking threshold in the subband i for subband signal SB. Thus, $w_{r,m}$ bears a relation to the maximum power of a signal in a subband m in which that signal will not be audible.

The vector $\{w\}$, therefore, has coefficients $w_i$ which are estimates of the masked quantizing noise in each subband i for subband signal $SB_i$. Quantizing-noise in a subband i for subband signal $SB_i$ which has a power of less than $w_i$, is thus inaudible. The coefficients $d_{ij}$ of the matrix $[D]$ can be calculated according to the literature in Philips Journal of Research, Vol. 44, 329-343, 1989, incorporated herein by reference.

The bit need $b_1$ to $b_M$ can be calculated from the following formula:

$$b_m = K_1 \cdot {}^2\log(\sqrt{SF_m^2/3w_m} + 1) \qquad \text{EQ. (3)}$$

or more generally:

$$b_m = K_1 \cdot {}^2\log(K_2\sqrt{SF_m^2/w_m} + K_3) \qquad \text{EQ. (4)}$$

The former formula, EQ. (3), can simply be derived from the latter formula, EQ. (4), by assuming: $K_2 = 1/\sqrt{3}$ and $K_3 = 1$. $K_1$, $K_2$ and $K_3$ are constants, for which it holds that $K_1$ is preferably equal to approximately 1 and $K_2$ is preferably equal to approximately $1\sqrt{3}$. $K_3$ has a wider range of possibilities. It may be assumed that $K_3$ will be less than 10, where $K_3$ will, for example, preferably be taken to be equal to 1 or may be neglected. In addition, in the latter case there will be a simpler implementation of the calculation.

The bit needs $b_1$ to $b_M$ are obtained in this fashion, and they are situated in a specific amplitude range. They may be negative and non-integers. A bit need $b_m$ bears a relation to the number of bits with which the samples in the q-sample signal block of a subband signal $SB_m$ should be quantized, so that it holds that if $b_{m1}$ for subband signal $SB_{m1}$ is greater than $b_{m2}$ for the subband signal $SB_{m2}$, the number of bits with which the q samples in a signal block of the subband signal $SB_{m1}$ should be quantized will have to be greater than the number of bits with which the q samples of the time-equivalent signal block of the subband signal $SB_{m2}$ should be quantized.

Figure 3:
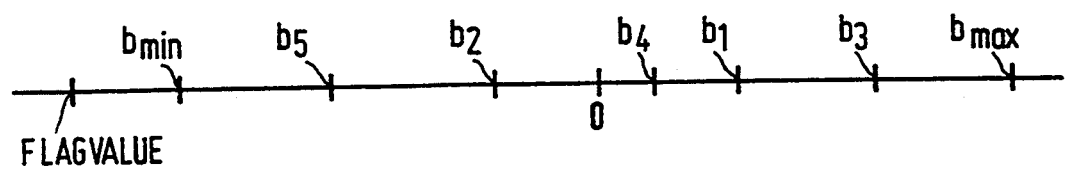
FIG. 3 shows the positions of the bit needs $b_1, b_2, \ldots$, along a value axis.

This is shown in qualitative terms with reference to FIG. 3. In FIG. 3, seven bit needs $b_1$ to $b_5$, $b_{max}$ and $b_{min}$ are plotted along a value axis. $b_{max}$ is the bit need having the maximum value and $b_{min}$ is the bit need having the minimum value. It will be noticed that $b_{min}$, $b_2$ and $b_5$ are negative and that, furthermore, the following holds: $b_{min} < b_5 < b_2 < b_4 < b_1 < b_3 < b_{max}$. In terms of quality, it may now be assumed that q samples in a signal block of subband signal $SB_m$, with $b_m = b_{min}$, should be quantized with the minimum number of bits and the q samples in a signal block of subband signal $SB_m$, with $b_m = b_{max}$, with the maximum number of bits.

Figure 4:
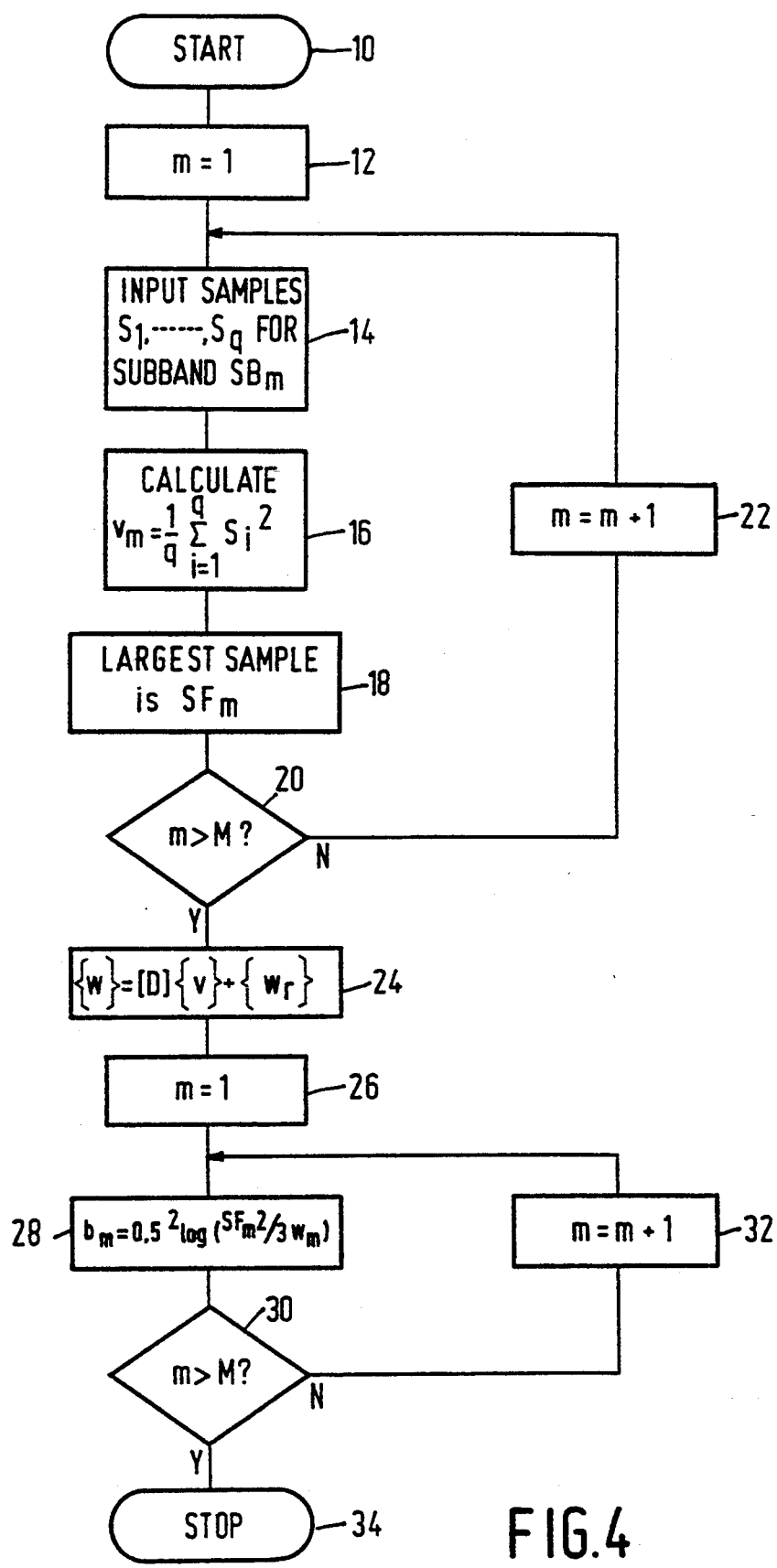
FIG. 4 shows the method of determining the bits needs $b_1, \ldots, b_P$, where P=M.

FIG. 4 shows a flow chart of the program of operation of the bit need determining unit 6 for determining the bit needs $b_1$ to $b_M$ for time-equivalent q-sample signal blocks of the subband signals $SB_1$ to $SB_M$. In this case only, a single q-sample signal block of a subband signal is considered. For each successive q-sample signal block of that subband signal, and the signal blocks of the other subband signals corresponding with aforesaid signal block (in case of a time-parallel subband signal supply), the operation represented in FIG. 4 will be performed once again.

The operation starts at block 10. First, the running variable m is set to 1 (block 12). Then, the q samples $S_1$, ..., $S_q$ in a signal block of a subband signal $SB_m$ are input (block 14) and the power $v_m$ is calculated (block 16). Also the scale factor $SF_m$ (block 18) is determined.

The blocks 14, 16 and 18 are repeated for all corresponding signal blocks of the subband signals via the loop through blocks 20 and 22. If the values $v_m$ and $SF_m$ have been determined for all corresponding signal blocks, the matrix calculation will be performed in order to obtain the vector $\{w\}$ (block 24).

Subsequently, m is again set to 1 (block 26) and the bit need ($b_m$) is determined (block 28) for all corresponding signal blocks of the subband signals via the loop through the blocks 30 and 32 after which the operation is terminated (block 34). The bit needs $b_m$ are determined in block 28 according to the formula given hereinbefore, with the constant $K_1$, $K_2$ and $K_3$ being equal to 1, $1\sqrt{3}$ and 0, respectively.

The program of FIG. 4 shows the time-consecutive calculations of the coefficients $v_1$ to $v_M$ in the vector $\{v\}$, compare the loop through block 22 in the program, and the method shows the time-consecutive calculations of the bit needs $b_1$ to $b_M$, compare the loop through block 32. This is a very suitable method, more specifically, if the corresponding signal blocks having the samples $s_1$ to $s_q$ for the subband signals $SB_1$, $SB_2$, . . . , $SB_{M-1}$, $SB_M$, are applied serially.

If the signal blocks are applied in parallel, the calculation of the coefficients $v_1$ to $v_M$ could be performed in parallel for all subband signals, and, thus, the loop through block 22 is avoided. Likewise, the bit needs $b_1$ to $b_M$ may be calculated in parallel, and this will render the loop through block 32 redundant.

The operation of the bit allocation unit 7 will now be explained. The flow chart of FIG. 5 for a program will be used for this purpose. The program determines for time-equivalent q-sample signal blocks in the subband signals $SB_1$ to $SB_M$ the values $n_1$ to $n_M$ from the bit needs $b_1$ to $b_M$. Here too it is a matter of a single signal block having q samples of a subband signal. For directly successive q-samples signal blocks in that subband signal and the time-equivalent signal blocks in the other subband signals, the method of FIG. 5 will be carried out again.

It is now assumed that, after quantization, $B_0$ bits are available for transmitting the overall information connected with the M signal blocks of q samples of, for example, 24 bits each. Assuming that after quantization, R bits are available per sample, averaged over the subbands, it holds that $B_0$ is equal to the largest integer smaller than $M \cdot q \cdot R$.

In copending application Ser. No. 07/997,158, it is shown that not only are the quantized samples transmitted, but also the scale factors $SF_1$ to $SF_M$ (scale factor information) and the bit allocation information (that is to say, information which bears a relation to the number of bits with which the samples in a signal block in a subband signal are to be quantized, i.e., the values $n_1$ to $n_M$). The bit allocation information is then represented by $y=4$ bits for each $n_m$. Thus, this implies that, actually, only $B = B_0 - y \cdot M$ bits are available for the transmission of M signal blocks of quantized subband signals and the scale factor information.

Copending application Ser. No. 07/997,158 further describes that the y-bit number (y=4) 0000 in the bit allocation information denotes that no samples are transmitted in the relevant subband. In that case, no scale factor information for that subband will be transmitted either. The scale factor information for a subband is represented by means of an x-bit number (x=6).

The method of bit allocation is now as follows. The method starts at block 40, FIG. 5. Initially, all numbers $n_m$ are first set to zero. Then an initial bit allocation is performed at block 44. (This initial bit allocation will be explained later). Then, the maximum bit need is determined. This is the bit need $b_j$. In the example of FIG. 3, this would be $b_{max}$. Next, it is considered whether $n_j$ is greater than or equal to a certain value $n_{max}$ (block 48). In the present example, $n_{max}$ is equal to 16. This means that the quantized samples can only be represented by binary numbers with a maximum of 16 bits.

If $n_j$ is greater than or equal to $n_{max}$, the q-sample signal block of the subband signal $SB_j$ will be excluded from the allocation of further bits. For this purpose, the bit need $b_j$ is made equal to a so-called "flag value" (block 66). The flag value is represented in FIG. 3 and is a value smaller than the minimum bit need $b_{min}$. If $c_1$, in the block 56 to be discussed hereinbelow, is greater than unity, $n_j$ might be greater than $n_{max}$. In addition, $n_j$ will then be assumed to be equal to $n_{max}$ at block 66.

If $n_j$ is equal to zero (block 50), the program will proceed through the blocks 52 and 54. At block 54, $a_1$ bits are initially allocated to the signal block of subband signal $SB_j$. This means $n_j = a_1$. The total number B of available bits now decreases by $a_1 \cdot q + x$. The q quantized samples of the signal block in the subband signal $SB_j$ are represented each by $a_1$ bits and, in addition, an x-bit-long scale factor $SF_j$ is to be added. Furthermore, in block 54, the bit need $b_j$ is decreased by a value $a_2$. If $n_j$ is unequal to zero, the program will proceed through block 56. The number of bits $n_j$ is now increased by $c_1$. The total number B of available bits now decreases by $c_1 \cdot q$, due to the fact that the q quantized samples of a signal block are now represented by an additional number of $c_1$ bits.

Naturally, bit allocation only takes place if there are still sufficient bits available. Therefore, block 52 is present. If there are insufficient bits available the program will proceed through block 66 at which the relevant bit need $b_j$ is again made equal to the flag value. The signal block in the subband concerned is then excluded from further bit allocation.

As long as there are bit needs that have values greater than the flag value (block 58) and as long as there are still sufficient bits available (block 60), the program will return through circuit 62 to block 46 for a next calculation of the maximum bit need. If all bit needs $b_m$ are smaller than or equal to the flag value, the program will stop. The program will also stop if there are insufficient bits to be allocated (block 60).

The method is characterized in that when a first bit allocation is performed (block 54), the number of allocated bits ($a_1$) is greater than the number of bits of one or more subsequent allocations (block 56) ($c_1$), worded differently $a_1 > c_1$. Furthermore, it holds that $a_2$ is greater than or equal to unity. Preferably, $a_1$ is equal to $a_2$ and $c_1$ equal to $c_2$. $a_1$, $a_2$, $c_1$ and $c_2$ are numbers greater than zero. $a_1$ and $c_1$ are preferably integers. But, this is not a necessity. An example may be shown for this purpose.

It is assumed that one wishes to quantize the q samples in a signal block in five levels. For this purpose, 3 bits are needed per sample. However, this is not an efficient encoding because a subdivision into seven levels of 3 bits is possible.

If, however, three samples are combined, these three samples each with five signal levels will present 125 options. These 125 options may be represented by means of a 7-bit binary number. Thus, no more than 7/3 bits per sample. $n_m$ would in that case be equal to 7/3. This will provide a more efficient encoding.

It has been indicated hereinbefore that when the quantized samples are transmitted, both scale factor information and bit allocation information are co-transmitted. The scale factor information then has the form of x-bit words, of which each x-bit word denotes a scale factor $SF_m$ that belongs to the q samples in a signal block of the subband signal $SB_m$. The bit allocation information then has the form of y-bit words, of which each y-bit would denotes a number of bits $n_m$ by which each sample in a signal block of the subband signal $SB_m$ is represented. This is described in copending application Ser. No. 07/997,158.

If in the bit need determining unit 6 only the scale factors $SF_m$ are used for calculating the powers $v_m$, that is to say, because $v_m$ is assumed to be equal to the square of $SF_m$, the bit allocation information need not be co-transmitted. On the receiver side, the bit needs $b_1$ to $b_M$ can be derived from the transmitted scale factors $SF_m$ and, on the basis of these needs, the magnitudes $n_1$ to $n_M$, while implementing the calculation method as discussed hereinbefore. Thus, the receiver likewise comprises a bit need determining unit which derives the powers $v_m$ from the scale factors $SF_m$ and derives from these powers the bit needs $b_m$, and also includes a bit allocation unit which is capable of calculating the magnitudes $n_1$ to $n_M$ on the basis of the bit needs $b_m$ and the available bit quantity which in this case is equal to $B_0$. Since, as observed hereinbefore, $B = B_0 - y \cdot M$, the latter method is advantageous in that more bits can be allocated to the subbands.

It may sometimes be necessary to pre-allocate a number of bits to a signal block of a subband signal $SB_m$, for example, in the case where there are signal blocks which must be quantized with more than zero bits irrespective of their bit need. The reason for this is that the signal blocks (namely subsequent signal blocks of one subband signal) must not be switched on or off in an unqualified manner. This would produce audible effects. It may sometimes also be necessary or useful to exclude a signal block in advance from bit allocation.

Figure 5:
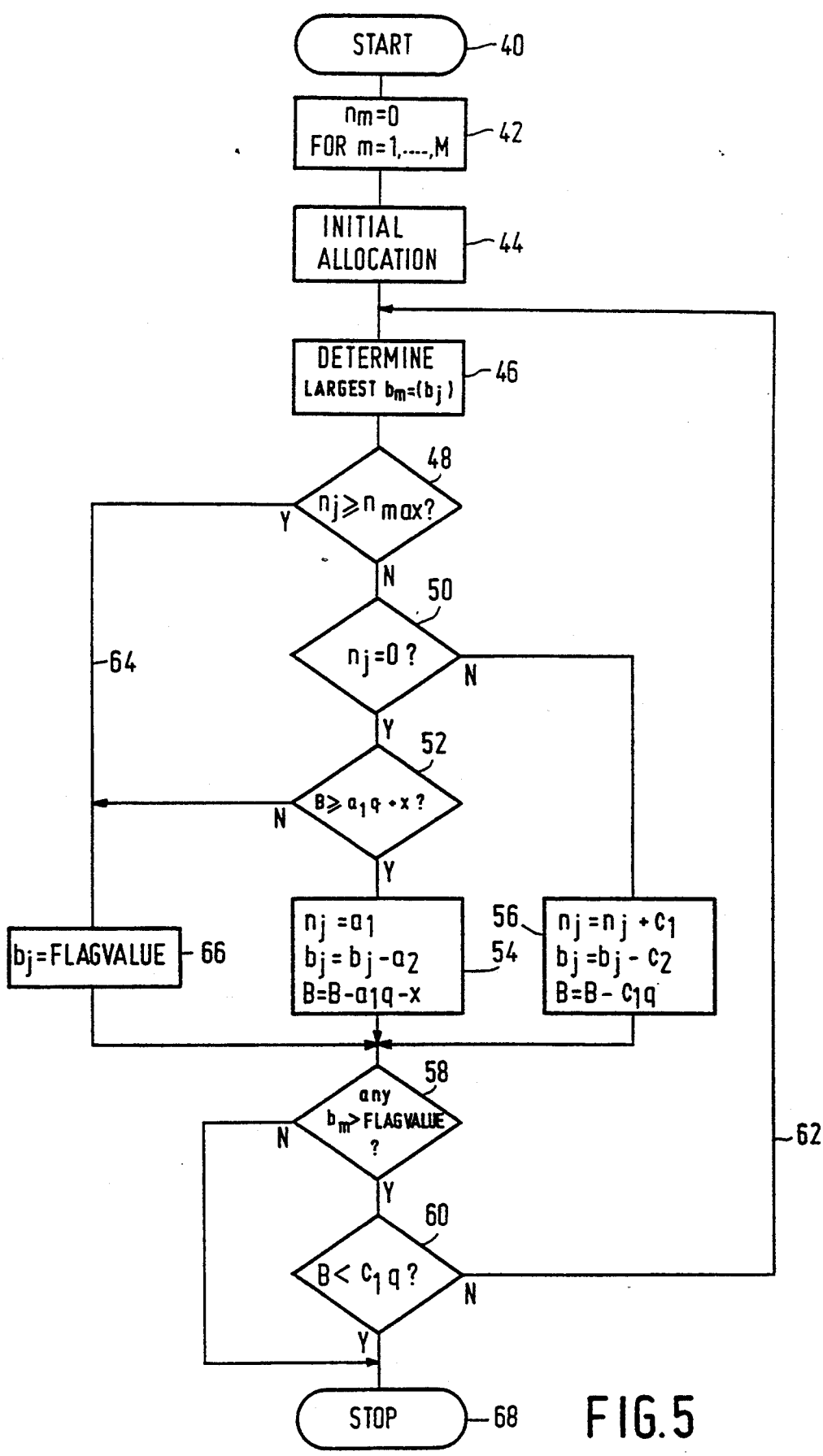
FIG. 5 shows the method of allocating bits to the signal blocks of the subband signals in the subbands.

For these purposes, block 44 in the program of FIG. 5 is inserted. FIG. 6 shows an elaboration of block 44.

In FIG. 6, the first two signal blocks are the signal blocks of the subband signals $SB_k$ and $SB_l$ to which have been preallocated a number of bits $A_{k0}$ or $A_{l0}$. This implies that $n_k = A_{k0}$ and $n_l = A_{l0}$. From the bit needs $b_k$ and $b_l$, the respective values $A_{k1}$ and $A_{l1}$ are subtracted and the remaining number of bits B is reduced by $A_{k0} \cdot q - x$ and $A_{l0} \cdot q - x$ respectively. Actually, for $A_{k0}$ and $A_{l0}$ the same holds as for $a_1$. Preferably, $A_{k0} = A_{l1} = a_1$. For $A_{k1}$ and $A_{l1}$ the same holds as for $a_2$. Preferably, $A_{k1} = A_{l1} a_2$. The signal blocks in the subband signals $SB_k$ and $SB_l$ may naturally be allocated more bits, as required, at block 56 of the method presented in FIG. 5.

Furthermore, at block 44 of FIG. 6, it is shown that the signal block of the subband signal $SB_f$ is excluded from bit allocation. For this purpose, the bit need $b_f$ for this signal block is made equal to the flag value.

Figure 11:
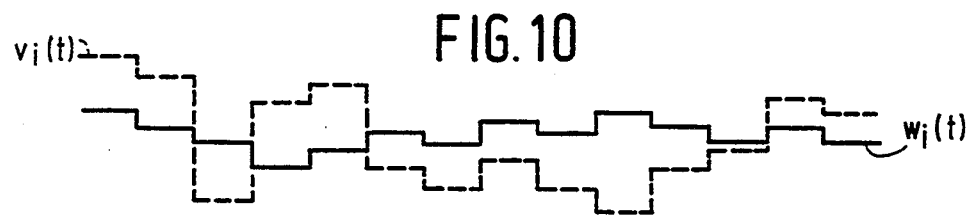
FIGS. 11, 12a, 12b and 13 show the different allocation stages in dependence on the power value v.
Figures 12A, 12B:
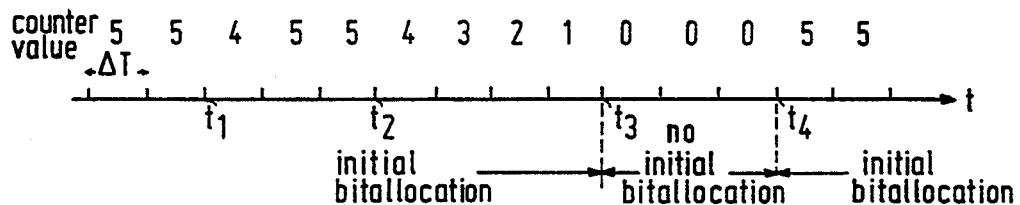
Figure 13:
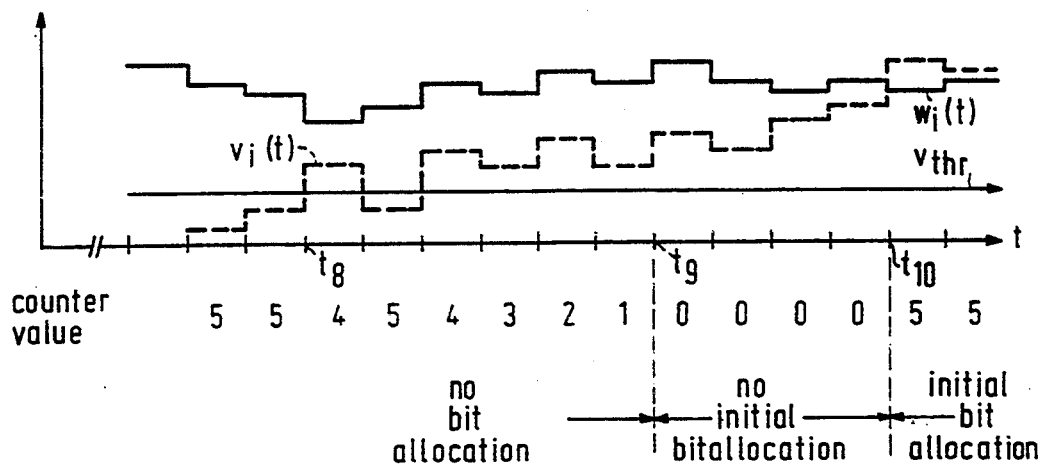

FIGS. 11, 12 and 13 represent the situations in which there is initial bit allocation, no initial bit allocation or no bit allocation to the subbands. The Figures show the consecutive time intervals $\Delta T$ in which a group of M corresponding signal blocks of the M subband signals are processed. In each time interval the power $v_i(t)$ and the magnitude $w_i(t)$ are determined for each subband signal $SB_i$ block. If $v_i(t)$ is greater than $w_i(t)$, there will be initial bit allocation to the subband signal $SB_i$ block. As will be evident from FIG. 11, this holds for periods of time situated before $t = t_1$.

Figure 14:
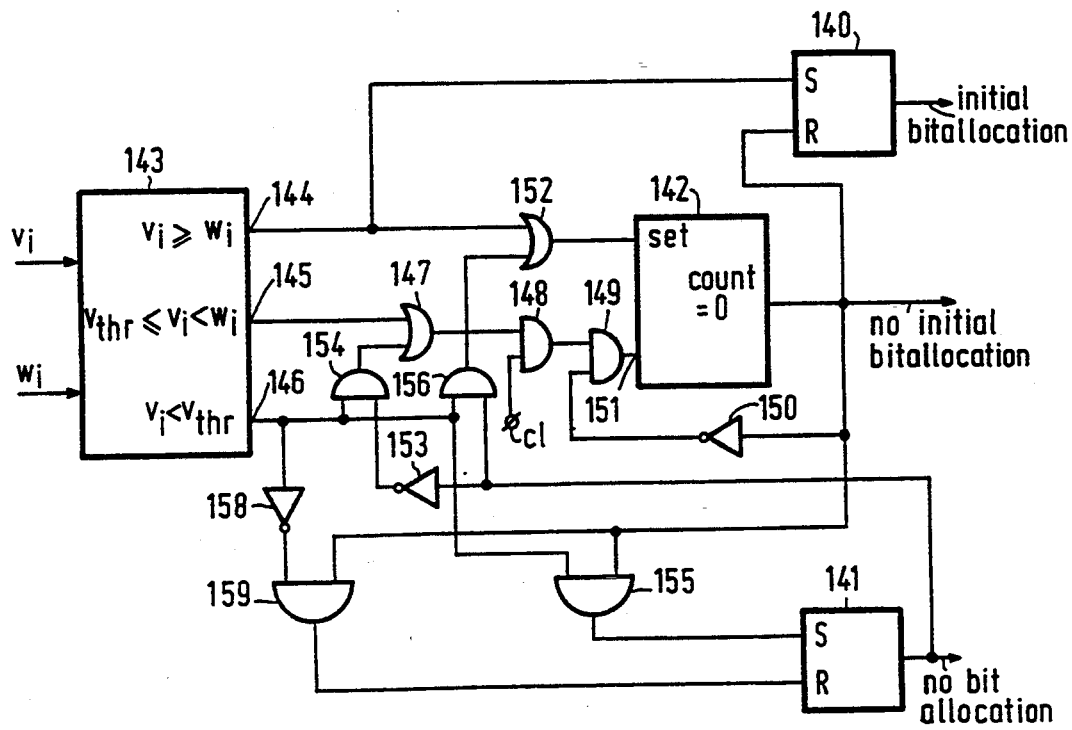
FIG. 14 is a functional block diagram of a circuit for generating the control signals required in the different allocation stages.

FIG. 14 is a block diagram of a circuit by means of which, on the basis of the magnitudes $v_i$ and $w_i$, control signals may be derived which denote whether initial bit allocation is to take place, in which case the output of the SR flip-flop 140 is "high" or "logic 1"; whether no bit allocation is to take place, in which case the output of the SR flop-flop 141 is "high"; or whether no initial bit allocation is to take place, in which case the output of a counter 142 is "high". In the latter case, bits may still be allocated to the subband signal block in question, but the allocation then takes place at block 54 and/or at block 56 according to the method of FIG. 5. These control signals may thus be applied to block 44 in FIG. 6 and denote what functions are to be performed in this block.

At the instant $t = t_1$, FIG. 11, $v_i(t)$ becomes smaller than $w_i(t)$. The output 144 of the comparator 143 now becomes "low" whereas the output 145 of this comparator becomes "high" Through the OR-gate 147, this "high" signal is applied to the AND-gate 148 so that clock pulses are passed to the AND-gate 149 at a rate f equal to $1/\Delta T$. Since a "high" signal is applied to the other input of the AND-gate 149 through the inverter 150, the clock pulses are passed to the input 151. The counter 142 now counts down from the initial position 5 (decimal) under the influence of the clock pulses. Since the output of the counter 142 remains "low", the position of the flip-flop 140 does not change so that the initial bit allocation is maintained.

One time interval later, $v_i(t)$ is again larger than $w_i(t)$. The output 144 of the comparator 143 becomes "high" again, which implies that the rising edge is fed to the set input of the counter 142 through the OR-gate 152. The count of counter 142 is reset to 5 (decimal). At the instant $t_2$, FIG. 11, $v_i(t)$ again becomes smaller than $w_i(t)$. Now, $v_i(t)$ remains smaller than $w_i(t)$ for a sufficiently long period of time to make it possible for the counter 142 to count back until the 0 count (decimal) is reached. This is reached at the instant $t = t_3$, FIG. 11. At that moment, the output of the counter 142 becomes "high". The flip-flop 140 is reset. Through inverter 150 and AND-gate 149 the counting operation of counter 142 is blocked so that it retains the 0 count.

Initial bits are no longer allocated to this subband signal block. At the instant $t = t_4$, FIG. 11, $v_i(t)$ again becomes larger than $w_i(t)$. The counter 142 is reset to the count 5 and, in addition, the flip-flop 140 is set in a manner so that initial bits are again allocated.

FIG. 12a represents a situation in which $v_i(t)$, prior to the instant at which the counter 142 is reset to zero, already becomes smaller than a specific threshold value $v_{thr}$. At the instant $t = t_5$, the output 145 of the comparator 143 becomes "low" again and the output 146 "high". Since the inverter 153 applies a "high" signal to one input of the AND-gate 154, the "high" signal is conveyed to the AND-gate 148 through the AND-gate 154 and the OR-gate 147. The counter 142 continues to count. The phase of the initial bit allocation is thus maintained until the count 0 (decimal) is reached. The output of the counter 142 now briefly rises. This entails that flip-flop 141 is set through the AND-gate 155. Through the AND-gate 156 and the OR-gate 152 the "high" signal of the flip-flop 141 is applied to the set input of the counter 142, which immediately afterwards jumps to count 5 (decimal). In addition, the further down-counting of the counter 142 is blocked because the inverter 153 applies a "low" signal to the one input of the AND-gate 154. From instant $t_6$ onwards, there is no bit allocation whatsoever to the relevant subband signal block.

FIG. 12b represents the situation in which $v_i(t)$ has remained in the range between $v_{thr}$ and $w_i(t)$ sufficiently long so that the phase of "no initial bit allocation" has commenced. At the instant $t_7$, $v_i$ will be smaller than $v_{thr}$. At that moment, the output 145 will become "low" and the output 146 "high". At that moment, the flip-flop 141 is set through the AND-gate 155 and the counter 142 is reset to the count 5 through the AND-gate 156 and the OR-gate 152. The output of the counter 142 thus becomes "low" and the output of the flip-flop 141 "high". There is no bit allocation.

FIG. 13 shows a situation in which $v_i(t)$ increases again. At the instant $t_8$, $v_i(t)$ becomes larger than $v_{thr}$. The output 145 becomes "high" so that the counter 142 may count down. One time interval later $v_i(t)$ is again smaller than $v_{thr}$. The output 146 becomes "high" again so that the counter is reset to the count of 5 through the AND-gate 156 and the OR-gate 152. If $v_i(t)$ is greater than $v_{thr}$ for a sufficiently long period of time, the counter 142 can count down to zero. At $t=t_8$, the output of counter 142 becomes "high". Through the AND-gate 159, to which a "high" signal is applied through the inverter 158, the flip-flop 141 is reset, so that at this moment the phase of "no bit allocation" is terminated and changed into the phase of "no initial bit allocation".

In the following, a simplified calculation of the bit need $b_m$ will be explained. In this calculation, a logarithmic representation is used for the various magnitudes which play a part in the calculation. This is possible because the concern is relative precision, not absolute, of the bit needs with respect to the calculation of the bit needs $b_1$ to $b_M$.

In logarithmic representation, a number g is approximated by $g=r^k$, where r is a fixed base greater than unity and the power k is selected to be an integer. The number g is approximated in the best possible way by a correct choice of k. The integer k is used as a representation of g. In the calculation for the bit need $b_m$ there are both multiplications of two numbers and additions of two numbers. Multiplications in the logarithmic representation correspond with the addition of the powers. That is to say, if $g_1=r^{k_1}$ and $g_2=r^{k_2}$, the logarithmic representation of $g_1 \cdot g_2$ will be equal to $k_1+k_2$.

For the logarithmic representation of additions of these two numbers $g_1$ and $g_2$, the following holds. Assuming that $g_1>g_2$, it holds that $g_1+g_2=r^{k_1}+T(k_1-k_2)$. The logarithmic representation for $g_1+g_2$ is thus equal to $k_1+T(k_1-k_2)$. $T(k_1-k_2)$ is a correction factor in the form of an integer which may be derived from a Table. FIG. 7 shows a Table of this type for $r=2^{1/16}$. The value for r equalling $2^{1/16}$ can be obtained from an accuracy analysis of the bit needs $b_m$.

It may further be inferred that the calculation of the bit need $b_m$ in a logarithmic representation with a properly selected base r, in lieu of the customary calculations in a linear fixed-point representation, considerably reduces the word widths of the numbers. In addition, no multiplier-accumulator is necessary for calculating the vector $\{w\}$, but only a simple accumulator and a Table having a restricted number of entries. The Table of FIG. 7, for example, narrows down to a ROM having contents smaller than 0.5 kbit. The series of numbers stored in the ROM is relatively small. In addition, these numbers are arranged in a specific order. Therefore, it is possible to reduce the look-up Table even more at the cost of some logic.

It should be observed in this context that the logarithmic representation for the addition of two numbers as described hereinbefore is known per se by the name of Zech logarithm and described in the F. J. MacWilliams et al. publication entitled "The Theory of Error Correcting Codes" (North Holland Publishing Co. 1983), compare, more specifically, chapter 3, section 4, page 191.

The bit need determining unit 6 and the bit allocation unit 7 may be realized as software. However, hardware designs are also possible. For example, FIG. 8 is a block diagram of a hardware design of the bit need determining unit 6.

Figure 8:
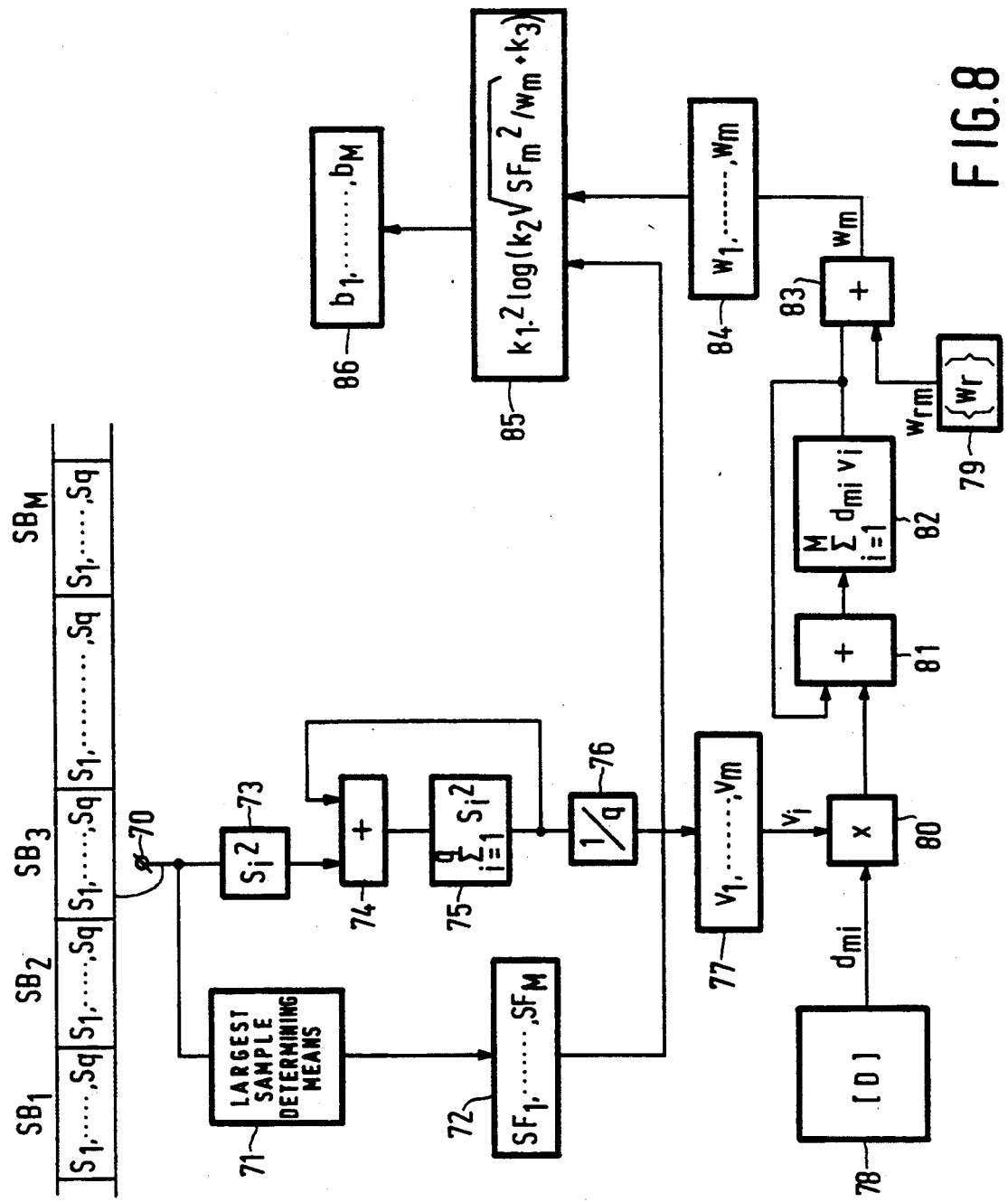
FIG. 8 is a functional block diagram of the bit need determining unit.

FIG. 8 shows the corresponding signal blocks of the subband signals $SB_1$ to $SB_M$, which are serially applied to input 70. The first sample $s_1$ of the subband signal $SB_1$ is applied first and the last sample $s_q$ of the subband signal $SB_M$ is applied last.

In the largest sample determining unit 71, the largest sample, i.e., $SF_m$, is determined for each signal block, which value is then stored in a memory 72. In a squaring unit 73, the samples are squared and thereafter applied to an input of an adder 74. The output of the adder 74 is coupled to an input of a memory 75. The output of that memory 75 is coupled both to a second input of the adder 74 and an input of a divider 76. The elements referenced 74, 75 and 76 determine the magnitude $v_m$ for each signal block, compare block 16 in FIG. 4. To this end, the first sample $s_1$ of a signal block 3 of the subband signal $SB_m$ is squared in the squaring unit 73 and, in adder 74, added to the value stored in memory 75, which value is momentarily zero, and thereafter stored in the memory 75. Subsequently, the second sample $s_2$ is squared, added to the value stored in memory 75 and then stored in that memory. This is continued until the last sample $s_q$ of the signal block of the subband signal $SB_m$ is squared and added to the value stored in memory 75. The sum thus obtained in the memory 75 is equal to $$\sum_{i=1}^{q} s_i^2$$

which then, after a division by q in the divider 76, is stored as a coefficient $v_m$ in memory 77. Similar calculations are made for the corresponding signal blocks of the further subband signals until all coefficients of the vector $\{v\}$ have been stored in the memory 77. The bit need determining unit 6 further includes a memory 78 for storing the matrix coefficient $d_{ml}$ of the matrix [D] and a memory 79 for storing the coefficients $w_{r-m}$ of the vector $\{w_r\}$. Outputs of the memories 77 and 78 are coupled to inputs of the multiplier 80. An output of the multiplier 80 is coupled to a first input of an adder 81 whose one output is coupled to the input of a memory 82. The output of the memory 82 is coupled both to a second input of the adder 81 and to a first input of an adder 83.

The elements referenced 80, 81 and 82 are intended to perform the matrix multiplication [D]$\{v\}$. During this operation, the value $d_{ml}$ from memory 78 is multiplied by the value $v_1$ from memory 77, and the result is added by adder 81 to the value present in memory 82 at that moment, which is zero, and then stored in memory 82. After this, $d_{m2}$ is multiplied by $v_2$, and the result is added to the value stored in memory 82. This is continued until $d_{mM}$ is multiplied by $v_M$ and the result is added to the value stored in memory 82. At that moment, the value $$\sum_{i=1}^{M} d_{mi} v_i$$

is stored in memory 82. In adder 83, the value $w_{r \cdot m}$ stored in memory 79 is added to this result. The value $w_m$ thus obtained is stored in memory 84. This procedure is reiterated for the corresponding signal blocks in the further subbands until all coefficients of the vector $\{w\}$ are stored in memory 84.

Subsequently, for each subband signal $SB_m$ block, the magnitudes $SF_m$ and $w_m$ are read from the memories 72 and 84 and applied to the calculation unit which eventually determines the bit need $b_m$. This bit need is stored in a memory 86. This calculation is also performed for the further time-equivalent blocks of the subband signals until all bit needs $b_1$ to $b_M$ are stored in the memory 86.

The procedure may be reiterated for a successive series of M signal blocks. Also the arrangement shown in FIG. 8 utilizes the fact that there is serial information supply. If the signal blocks were supplied in parallel, the calculation could largely be performed in parallel. This means, for example, that the circuit comprising the elements 71, 73, 74, 75 and 76 could occur M times in the arrangement. The circuit comprising elements 80, 81, 82 and 83 could then likewise occur M times.

Figure 9:
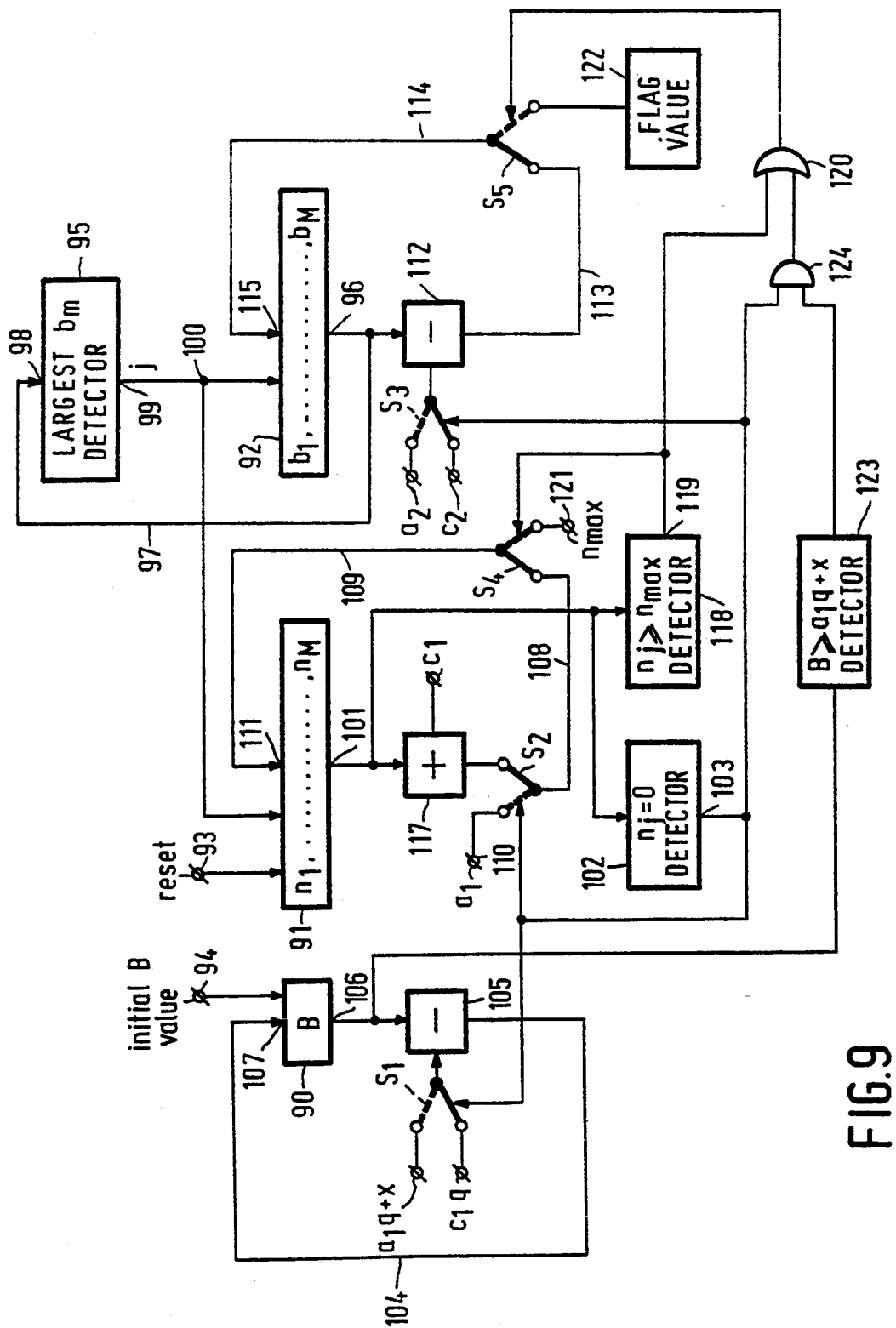
FIG. 9 is a functional block diagram of the bit allocation unit.

FIG. 9 is a block diagram of an embodiment of the bit allocation unit 7. It comprises a memory 90 in which the number of bits B still to be allocated have been stored, a memory 91 in which the values $n_1$ to $n_M$ are stored and a memory 92 in which the bit needs $b_1$ to $b_M$ have been stored. This memory 92 could correspond with memory 86 of FIG. 8. At the beginning of an allocation cycle, the initial value for B is stored in memory 90, which value is available at terminal 94. Furthermore, the initial values for the bit needs $b_1$ to $b_m$ have been stored in memory 92, whereas memory 91 stores all zeros fed to terminal 93 by means of reset signals.

Subsequently, detector 95 determines the maximum value of the bit needs stored in memory 92. This may, for example, be realized by successively reading out all bit needs $b_1$ to $b_M$ at the output 96 and applying these bit needs through line 97 to the input 98 of the detector 95. At the output 99, the detector 95 provides the index of the maximum bit need $b_j$. This index j is used as an address for addressing, through line 100, the locations in the memories 91 and 92 in which the values are stored for $n_j$ and $b_j$, respectively, so that these values are available at the respective outputs 101 and 96. Output 101 is coupled to an input of an $n_j=0$ detector 102. If the detector 102 detects $n_j=0$, it provides at output 103 a control signal which is applied to control signal inputs of controllable switches $S_1$, $S_2$ and $S_3$. These switches then assume different positions from the ones shown in FIG. 9. This results in a subtractor 105 subtracting the value $a_1 \cdot q + k$ from the value B available at output 106 of memory 90, and this new value is again applied to input 107 of this memory through line 104 so that the new value is stored in memory 90. Furthermore, through lines 108 and 109 the value $a_1$, which is available at terminal 110, is applied to the input 111 of memory 91. Switch S4 then has the position shown in FIG. 9, and $a_1$ is stored in memory 91 as a new value for $n_j$. In the subtractor 112, the value $a_2$ is subtracted from the value $b_j$ available at the output 96 of memory 92. The value, thus obtained, is applied to input 115 through lines 113 and 114, while switch $S_5$ has the position shown in FIG. 9, so that the new value for $b_j$ can be stored in the memory location $b_j$ in memory 92. The sequence described hereinbefore corresponds to the method as denoted in block 54 in FIG. 5.

If the detector 102 detects that $n_j$ is unequal to zero, no (or a different) control signal is generated. Switches $S_1$, $S_2$ and $S_3$ then have the positions shown in FIG. 9. The value $c_1 \cdot q$ is now subtracted from the value B stored in memory 90, and the result, thus obtained, is stored again in memory 90. In the adder 117, the value $c_1$ is added to the value $n_j$, which is read from the memory 91 through output 101. Again, through lines 108 and 109, the new value for $n_j$ is applied to input 111 of memory 91 to be stored in the memory 91. Furthermore, in subtractor 112, the value $c_2$ is subtracted from the value $b_j$ present at the output 91, and the value, thus obtained, is applied to input 115 through lines 113 and 114 in order to be stored in memory 92. This sequence corresponds with block 56 of the method shown in FIG. 5.

In the method of FIG. 5, there is further shown a block 48 for making a decision as is whether $n_j \geq n_{max}$?. If it is, $b_j$ is made equal to the flag value (block 66 in FIG. 5), and $n_j$ is made equal to $n_{max}$ (should it turn out to be necessary). In the circuit of FIG. 9, this has been taken into account by means of the $n_j \geq n_{max}$ detector 118. If detector 118 detects a situation in which $n_j \geq n_{max}$, it generates at its output 119 a control signal which is applied to the control input of the controllable switch $S_4$ and, through an OR-gate 120, to the control input of the controllable switch $S_5$, which switches then assumes positions different from the ones shown in FIG. 9. The value $n_{max}$, applied to the terminal 121, is now applied to the input 111 of memory 91. $n_{max}$ is then stored in the memory location for $n_j$ in memory 91. Accordingly, the flag value, block 122, is applied to input 115 so that the flag value is stored in the memory location for $b_j$ in memory 92.

It will be evident that there is a central control unit (not shown) which detects the output signal of detector 118 and, on detection of this signal, applies only load pulses to the memories 91 and 92 for storing there $n_{max}$ and the flag value. No load pulse is then applied to memory 90, since the value B in the memory is to remain unchanged.

Furthermore, the flag value is allocated to $b_j$ if both $n_j$ is equal to zero and $B \geq a_1 \cdot q + x$ (see the blocks 50, 52 and 66 in FIG. 5). Thus, the circuit of FIG. 9 includes the detector 123 and the AND-gate 124. At the occurrence of detection signals of both detector 103 and detector 123, switch $S_5$ is again set to the opposite position shown in FIG. 9, and the flag value $b_f$ is stored in memory 92 in location j. In this case, the central processor will generate a load pulse only for memory 92 and no load pulses for memories 90 and 91.

It will be self-evident that the initial bit allocation as described with reference to FIG. 6 may also be implemented here, for example, controlled by the necessary control and address signals from the central controller. This will not be explained any further because after the above explanation it may be assumed to be within the grasp of those skilled in the art.

Figure 10:
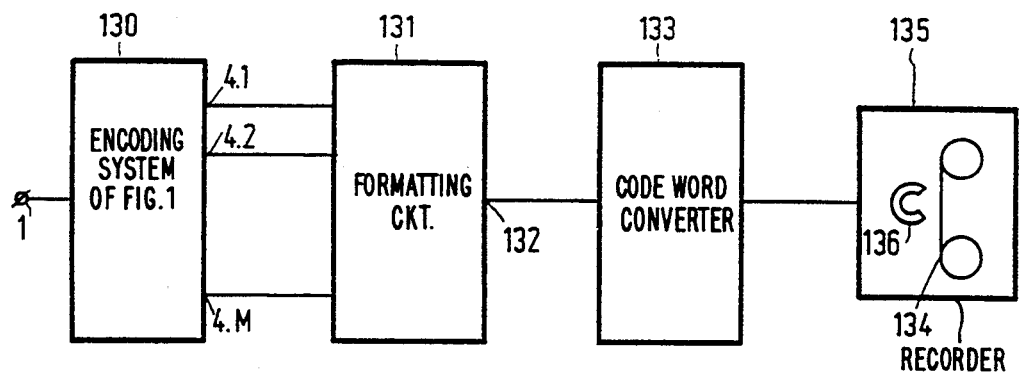
FIG. 10 shows the use of the encoding system of FIG. 1 in a transmitter in the form of a recording arrangement for recording the quantized subband signals on a magnetic record carrier.

FIG. 10 shows the use of the encoding system as described hereinbefore, in a transmitter, especially a transmitter in the form of a recording arrangement for recording the quantized subband signals in one or more tracks on a magnetic record carrier. The section referenced 130 is the encoding system of FIG. 1, (i.e., a subband coder) discussed hereinbefore, which produces the quantized subband signals at the outputs 4.1 to 4.M. The section referenced 131 is a formatting circuit which assembles the quantized subband signals into an encoded output digital signal which is available at output 132. This encoded output digital signal comprises successive frames of which the format is extensively discussed in copending patent application Ser. No. 07/997,158. The structure of the formatting circuit 131 is also explained therein.

The section referenced 133 is a code word converter which renders the encoded output digital signal suitable for recording on a record carrier, for example, a magnetic record carrier 134. The converter 133 comprises an 8-to-10 converter. In a converter of this type, 8-bit data words in the serial information stream are converted to 10-bit code words. Furthermore, interleaving may take place. The objective of this is to enable error correction of the received information on the receiver side (when reproducing the data on the record carrier).

The output signal of converter 133 is applied to a recorder 135 by which the signal is recorded in one or more longitudinal tracks on the record carrier 134. The recorder 135 comprises one or more recording heads 136.

For a further explanation of the arrangement of FIG. 10, copending U.S. patent application Ser. No. 07/669,136 filed Mar. 13, 1991 should be referred to, which is also incorporated herein by reference.

It should further be observed that the invention is not restricted only to the depicted exemplary embodiments. Various modifications of the embodiments described are feasible without departing from the scope of the invention as defined in the ensuing claims.

In the foregoing the bit need determination and bit allocation have been described for a number of M subband signals when there is a single subband signal (for example, a mono signal) in each subband. However, the invention may also be applied to a system for subband encoding of a stereo signal. This means that there will be two subband signals in each subband, that is to say, a left and a right subband signal. Two alternative ways of subband encoding of a stereo signal will be briefly discussed hereinbelow.

A first option is to process the left and right subband signals separately in the manner described above. The M subband signals $SB_1$ to $SB_M$ as discussed above are then, for example, the M left subband signals. The procedure discussed hereinbefore is then carried out for these left subband signals. In the bit need determining unit 6, first the bit needs $b_{1l}$ to $b_{Ml}$ are determined. Thereafter, the numbers of bits to be allocated, i.e., $n_{1l}$ to $n_{Ml}$, are determined in the bit allocation unit 7. In the procedure discussed above and explained with reference to FIG. 5, the value B was used for the bit allocation, B being equal to the number of available bits. It will be obvious that in the present case just half this number of available bits B is used for determining $n_{1l}$ to $n_{Ml}$. The other half of the number of available bits will then be used for bit allocation to the right subband signals.

The arrangement for the stereo signal subband encoding according to the first option actually comprises twice the arrangement shown in FIG. 1. The second section of the arrangement thus comprises a second splitter unit, such as the splitter unit 2, for generating the M right subband signals. Furthermore, another bit need determining unit is present, such as unit 6, which determines the bit needs $b_{1r}$ to $b_{Mr}$, and another bit allocation unit, such as unit 7, which derives therefrom the numbers of allocated bits $n_{1r}$ to $n_{Mr}$. Also for this purpose, half the actual number of available bits is available.

According to a second option for subband encoding of a stereo signal, the bit needs $b_{1l}$ to $b_{Ml}$ and $b_{1r}$ to $b_{Mr}$ are derived in the same manner as in the first option. In contradistinction to the first option, however, in which the bit allocation for the left and right subband signals was performed separately, in the second option, the 2M bit needs $b_{1l}$ to $b_{Ml}$ and $b_{1r}$ to $b_{Mr}$ are applied to a bit allocation unit such as unit 7, which then naturally has 2M inputs. In this unit, the 2M numbers $n_{1l}$ to $n_{Ml}$ and $n_{1r}$ to $n_{Mr}$ are derived in a manner similar to the manner described above with reference to FIG. 5 on the basis of the actually available number of bits. For this purpose, the bit allocation unit has 2M outputs.

It should further be observed that when a stereo signal is encoded, 2M values for the bit allocation information are concerned, represented each by y bits. This means that for the bit allocation procedure for a stereo signal no more than $B = B_0 - 2 \cdot y \cdot M$ bits are available.

We claim:

1. An encoding system for encoding a digital signal having a specific sampling frequency and bandwidth, comprising:

splitter means for dividing the bandwidth of the digital signal into M successive subbands, and generating, in response to the digital signal, P subband signals having reduced sampling frequencies, each of the subband signals being associated with one of the subbands;

quantizing means for quantizing time-equivalent signal blocks of the subband signals, a subband signal $SB_m$ of the subband signals having successive signal blocks which each contain q samples of that subband signal, each sample in a signal block of subband signal $SB_m$ being quantized by $n_m$ bits, where $n_m$ may vary for different signal blocks of subband signal $SB_m$;

bit need determining means for determining bit needs for the time-equivalent signal blocks, a bit need $b_m$ for a signal block of subband signal $SB_m$ corresponding to the number of bits by which the q samples in that signal block should be represented, where $b_m$ may vary for different signal blocks of subband signal $SB_m$; and bit allocation means for allocating bits to the time-equivalent signal blocks from an available number of bits B, $n_m$ bits being allocated to each of the q samples of a signal block of subband signal $SB_m$ in accordance with at least the bit need $b_m$ for that signal block;

wherein m and P are integers such the $1 \leq m \leq P$ and said bit allocation means is adapted for allocating bits to the time-equivalent signal blocks by performing a routine $S_1$, which includes the following operations, at least twice:

(a) determining which signal block of the time-equivalent signal blocks has a highest bit need $b_j$, where $b_j$ denotes the bit need $b_m$ for that signal block and j is an integer, such that $1 \leq j \leq P$, which denotes the same subband signal which m denotes for that signal block; and (b1) if bits have not already been allocated to the signal block having the highest bit need $b_j$, then
  (i) allocating $a_1$ bits to $n_j$, where $n_j$ denotes the $n_m$ bits allocated to each of the q samples of the signal block having the highest bit need $b_j$, to arrive at a value for $n_j$,
  (ii) subtracting $a_2$ from $b_j$ to arrive at a reduced value for $b_j$, and
  (iii) subtracting $a_1 \cdot q + x$ from B to arrive at a reduced value for B; or (b2) if bits have already been allocated to the signal block having the highest bit need $b_j$, then
  (i) allocating $c_1$ additional bits to $n_j$ to arrive at an increased value for $n_j$,
  (ii) subtracting $c_2$ from $b_j$ to arrive at a reduced value for $b_j$, and
  (iii) subtracting $c_1 \cdot q$ from B to arrive at a reduced value for B;

wherein q and x are positive integers greater than unity, x being a number of bits necessary to represent a scale factor for the signal block having the highest bit need $b_j$; $n_m$, $n_j$, $b_m$ and $b_j$ are variables where $n_m$ and $n_j$ are greater than or equal to zero; $a_1$, $a_2$, $c_1$ and $c_2$ are numbers greater than zero, $a_1$ is greater than $c_1$ and $a_2$ is greater than or equal to $c_2$; and B and M are positive integers.

2. The encoding system as claimed in claim 1, wherein said bit allocation means is further adapted to perform the following operations for at least one of the time-equivalent signal blocks prior to performance of the operations of the routine $S_1$:

subtracting $A_{k1}$ from $b_k$, where $b_k$ denotes the bit need $b_m$ for that at least one signal block and k denotes the same subband signal which m denotes for that at least one signal block, to arrive at a reduced value for $b_k$;

allocating $A_{k0}$ bits to $n_k$, where $n_k$ is the $n_m$ bits allocated to each of the q samples of that at least one time-equivalent signal block, to arrive at a value for $n_k$; and subtracting $A_{k0} \cdot q + x$ from B to arrive at a reduced value for B;

where $A_{k0}$ and $A_{k1}$ are numbers greater than zero, $n_k$ and $b_k$ are variables and k is an integer such that $1 \leq k \leq P$.

3. The encoding system as claimed in claim 2 wherein $A_{k0}$ is equal to $a_1$ and $A_{k1}$ is equal to $a_2$.

4. The encoding system as claimed in claim 1, wherein said bit allocation means is further adapted for allocating a flag value to at least one of the time-equivalent signal blocks, which flag value indicates that no bits are to be allocated to the q samples in that at least one time-equivalent signal block.

5. The encoding system as claimed in claim 1, wherein characterized $a_1$ is equal to $a_2$ and $c_1$ is equal to $c_2$.

6. The encoding system as claimed in claim 1 for subband encoding of a single digital signal, such as a mono signal or a left or right signal portion of a stereo signal, wherein P=M.

7. The encoding system as claimed in claim 6, wherein there is one subband signal associated with each subband.

8. The encoding system as claimed in claim 1 for subband encoding of a stereo signal, comprising a left and a right signal portion, wherein P=2M.

9. The encoding system as claimed in claim 6, wherein there are two subband signals associated with each subband.

10. The encoding system as claimed in claim 1, further comprising signal formatting means for assembling into a frame of an output digital signal having successive frames the q samples from time-equivalent signal blocks which have been quantized by said quantizer means, scale factor information being included in the frame in the form of x-bit words representing scale factors associated with the time-equivalent signal blocks for which the q samples are included in the frame.

11. A transmitter comprising an encoding system as claimed in claim 10.

12. The transmitter as claimed in claim 11, wherein the transmitter is adapted for recording the output digital signal in at least an track on a record carrier.

13. The transmitter as claimed in claim 12, wherein the record carrier is a magnetic record carrier.

14. The encoding system as claimed in claim 1 wherein said bit allocation means is further adapted for repeating the operations of the routine $S_1$ continuously until B has been reduced below $c_1 \cdot q$.

15. The encoding system as claimed in claim 1, wherein said bit allocation means is further adapted for repeating the operations of the routine $S_1$ continuously until either B has been reduced below $c_1 \cdot q$ or the bit need $b_m$ for each of the time-equivalent signal blocks becomes less than or equal to a flag value.

16. The encoding system as claimed in claim 1, wherein said splitter means comprises filter means for dividing the bandwidth of the digital signal into the M subbands and generating in response to the the digital signal P original subband signals having sampling frequencies which are substantially the same as the specific sampling frequency, and sampling means for converting the orignal subband signals into the subband signals having reduced sampling frequencies.

17. A method of encoding a digital signal having a specific sampling frequency and bandwidth, comprising:

dividing the bandwidth of the digital signal into M subbands, and generating, in response to the digital signal, P subband signals having reduced sampling frequencies, each of the subband signals being associated with one of the subbands; and quantizing time-equivalent signal blocks of the subband signals, a subband signal $SB_m$ of the subband signals having successive signal blocks which each contain q samples of that subband signal, each sample in a signal block of subband signal $SB_m$ being quantized by $n_m$ bits, where $n_m$ may vary for different signal blocks of subband signal $SB_m$;

wherein m and P are integers such that $1 \leq m \leq P$ and in order to quantize the time-equivalent signal blocks, the following steps are performed:

determining bit needs for the time-equivalent signal blocks, a bit need $b_m$ for a signal block of subband signal $SB_m$ corresponding to the number of bits by which the q samples in that signal block should be represented, where $b_m$ may vary for different signal blocks of subband signal $SB_m$; and allocating bits to the time-equivalent signal blocks from an available number of bits B, $n_m$ bits being allocated to each of the q samples of a signal block of subband signal $SB_m$ in accordance with at least the bit need $b_m$ for that signal block, the bits being allocated to the time-equivalent signal blocks by performing a routine $S_1$, which includes the following operations, at least twice:
- (a) determining which signal block of the time-equivalent signal blocks has a highest bit need $b_j$, where $b_j$ denotes the bit need $b_m$ for that signal block and j is an integer, such that $1 \leq j \leq P$, which denotes the same subband signal which m denotes for that signal block; and
- (b2) if bits have not already been allocated to the signal block having the highest bit need $b_j$, then
  - (i) allocating $a_1$ bits to $n_j$, where $n_j$ denotes the $n_m$ bits allocated to each of the q samples of the signal block having the highest bit need $b_j$, to arrive at a value for $n_j$,
  - (ii) subtracting $a_2$ from $b_j$ to arrive at a reduced value for $b_j$, and
  - (iii) subtracting $a_1 \cdot q + x$ from B to arrive at a reduced value for B; or
- (b2) if bits have already been allocated to the signal block having the highest bit need $b_j$, then
  - (i) allocating $c_1$ additional bits to $n_j$ to arrive at an increased value for $n_j$,
  - (ii) subtracting $c_2$ from $b_j$ to arrive at a reduced value for $b_j$, and
  - (iii) subtracting $c_1 \cdot q$ from B to arrive at a reduced value for B;

wherein q and x are positive integers greater than unity, x being a number of bits necessary to represent a scale factor for the signal block having the highest bit need $b_j$; $n_m$, $n_j$, $b_m$ and $b_j$ are variables where $n_m$ and $n_j$ are greater than or equal to zero; $a_1$, $a_2$, $c_1$, and $c_2$ are numbers greater than zero, $a_1$ is greater than $c_1$ and $a_2$ is greater than or equal to $c_2$; and B and M are positive integers.

18. The method as claimed in claim 17 wherein prior to performance of the operations of the routine $S_1$, the following additional steps are performed for at least one of the time-equivalent signal blocks subtracting $A_{k1}$ from $b_k$, where $b_k$ denotes the bit need $b_m$ for that at least one signal block and k denotes the same subband signal which m denotes for that at least one signal block, to arrive at a reduced value for $b_k$;

allocating $A_{k0}$ bits to $n_k$, where $n_k$ is the $n_m$ bits allocated to each of the q samples of that at least one signal block, to arrive at a value for $n_k$; and subtracting $A_{k0} \cdot q + x$ from B to arrive at a reduced value of B;

where $A_{k0}$ and $A_{k1}$ are numbers greater than zero, $n_k$ and $b_k$ are variables and k is an integer such that $1 \leq k \leq P$.

19. The method as claimed in claim 18, wherein $A_{k0}$ is equal to $a_1$ and $A_{k1}$ is equal to $a_2$.

20. The method as claimed in claim 17, further comprising assigning a flag value to at least one of the time-equivalent signal blocks, said flag value signifying that no bits are to be allocated to the q samples in that at least one time-equivalent signal block.

21. The method as claimed in claim 17, wherein $a_1$ is equal to $a_2$ and $c_1$ is equal to $c_2$.

22. The method as claimed in claim 17, wherein said the operations of the routine $S_1$ are continuously repeated until B has been reduced below $c_1 \cdot q$.

23. The method as claimed in claim 17, wherein the operations of the routine $S_1$ are continuously repeated until either B has been reduced below $c_1 \cdot q$ or the bit need $b_m$ for each of the time-equivalent signal blocks becomes less than or equal to a flag value.

24. The method as claimed in claim 17, further comprising assembling into a frame of an output signal having successive frames the q samples from time-equivalent signal blocks which have been quantized, scale factor information being included in the frame in the form of x-bit words representing scale factors associated with the time-equivalent signal blocks for which the q samples are included in the frame.

25. The method as claimed in claim 24, further comprising recording the output digital signal on a record carrier.

26. An encoding system for encoding a digital signal, comprising:

means for dividing the digital signal into a plurality of subband signals, each of the subband signals having a plurality of signal blocks, each containing q samples of that subband signal, where q is a positive integer, which are successive in time, each of the signal blocks of a subband signal being time-equivalent with a corresponding signal block of each of the other subband signals, corresponding signal blocks of the subband signals constituting time-equivalent signal blocks;

means for quantizing each of the q samples of each of the time-equivalent signal blocks with $n_m$ bits, where $n_m$ is a variable greater than or equal to zero which may vary for the time-equivalent signal blocks and/or different signal blocks within the same subband signal and m is a positive integer denoting which one of the subband signals a signal block comes from;

means for determining a bit need $b_m$ for each of the time-equivalent signal blocks, where $b_m$ is a variable which may vary for the time-equivalent signal blocks and/or different signal blocks within the same subband signal, the bit need $b_m$ for each of the time-equivalent signal blocks corresponding to the number of bits by which the q samples in that signal block should be represented; and bit allocation means for allocating, from an available number of bits B, where B is a positive integer, the $n_m$ bits to each of the q samples of each of the time-equivalent signal blocks in accordance with the bit need $b_m$ for each of the time-equivalent signal blocks, said bit allocation means being adapted to at least twice:
- (a) allocate to the signal block of the time-equivalent signal blocks having the bit need $b_m$ which is highest (i) a first number of bits if bits have not already been allocated to that signal block or (ii) an additional second number of bits if bits have already been allocated to that signal block, where the first number is greater than the second number, and
- (b) reduce (i) the bit need $b_m$ for the signal block of the time-equivalent signal blocks having the bit need $b_m$ which is highest and (ii) the available number of bits B.

27. The encoding systems as claimed in claim 26, wherein said bit allocation means is adapted to perform the following operations:
- (a) determine which signal block of the time-equivalent signal blocks has a highest bit need $b_j$, where $b_j$ is a variable which denotes the bit need $b_m$ for that signal block and j is an integer which denotes the same subband signal which m denotes for that signal block; and (b1) if bits have not already been allocated to the signal block having the highest bit need $b_j$, then (i) allocate $a_1$ bits to $n_j$, where $n_j$ is a variable which denotes the $n_m$ bits allocated to each of the q samples of the signal block having the highest bit need $b_j$, to arrive at a value for $n_j$, (ii) subtract $a_2$ from the highest bit need $b_j$ to arrive at a reduced value for $b_j$, and (iii) subtract $a_1 \cdot q + x$ from B to arrive at a reduced value for B; or (b2) if bits have already been allocated to the signal block having the highest bit need $b_j$, then (i) allocate $c_1$ additional bits to $n_j$ to arrive at an increased value for $n_j$, (ii) subtract $c_2$ from the highest bit need $b_j$ to arrive at a reduced value for $b_j$, and (iii) subtract $c_1 \cdot q$ from B to arrive at a reduced value for B;

where x is an integer greater than unity corresponding to a number of bits necessary to represent a scale factor for the signal block having the highest bit need $b_j$; and $a_1$, $a_2$, $c_1$ and $c_2$ are numbers greater than zero, where $a_1$ is greater than $c_1$ and $a_2$ is greater than or equal to $c_2$.

28. The encoding system as claimed in claim 26, wherein said bit allocation means is further adapted to preallocate a predetermined number of bits to at least one of the time-equivalent signal blocks prior to (a) allocating bits to the signal block having the bit need $b_m$ which is the highest and (b) reducing (i) the bit need $b_m$ for the signal block having the bit need $b_m$ which is the highest and (ii) the available number of bits B.

29. The encoding system as claimed in claim 26, wherein said bit allocation means is further adapted to allocate a flag value to at least one of the time-equivalent signal blocks, which flag value indicates that no bits are to be allocated to that signal block.

30. The encoding system as claimed in claim 26, further comprising signal formatting means for assembling into a frame of an output digital signal having successive frames the q samples from the time-equivalent signal blocks which have been quantized, scale factor information being included in the frame in the form of x-bit words representing scale factors associated with the time-equivalent signal blocks for which the q samples are included in the frame.

31. A transmitter, comprising the encoding system claimed in claim 30.

32. The transmitter as claimed in claim 31, further comprising means for recording the output digital signal in at least one track on a record carrier.

33. A transmitter, comprising the encoding system claimed in claim 26.

34. The encoding systems as claimed in claim 26, wherein the subband signals have reduced sampling frequencies as compared to the digital signal.

35. A method for encoding a digital signal, comprising:

dividing the digital signal into a plurality of subband signals, each of the subband signals having a plurality of signal blocks, each containing q samples of that subband signal, where q is a positive integer, which are successive in time, each of the signal blocks of a subband signal being time-equivalent with a corresponding signal block of each of the other subband signals, corresponding signal blocks of the subband signals constituting time-equivalent signal blocks;

quantizing each of the q samples of each of the time-equivalent signal blocks with $n_m$ bits, where $n_m$ is a variable greater than or equal to zero which may vary for the time-equivalent signal blocks and/or different signal blocks within the same subband signal and m is a positive integer denoting which one of the subband signals a signal block comes from;

wherein in order to quantize each of the time-equivalent signal blocks, the following additional steps are performed:

determining a bit need $b_m$ for each of the time-equivalent signal blocks, where $b_m$ is a variable which may vary for the time-equivalent signal blocks and/or different signal blocks within the same subband signal, the bit need $b_m$ for each of the time-equivalent signal blocks corresponding to the number of bits by which the q samples in that signal block should be represented; and allocating, from an available number of bits B, where B is a positive integer, the $n_m$ bits to each of the q samples of each of the time-equivalent signal blocks in accordance with the bit need $b_m$ for each of the time-equivalent signal blocks by at least twice:

(a) allocating to the signal block of the time-equivalent signal blocks having the bit need $b_m$ which is highest (i) a first number of bits if bits have not already been allocated to that signal block or (ii) an additional second number of bits if bits have already been allocated to that signal block, where the first number is greater than the second number, and (b) reducing (i) the bit need $b_m$ for the signal block of the time-equivalent signal blocks having the bit need $b_m$ which is highest and (ii) the available number of bits B.

36. The method as claimed in claim 35, wherein allocating the $n_m$ bits to each of the q samples of each of the time-equivalent signal blocks includes the following operations:

(a) determining which signal block of the time-equivalent signal blocks has a highest bit need $b_j$, where $b_j$ is a variable which denotes the bit need $b_m$ for that signal block and j is an integer which denotes the same subband signal which m denotes for that signal block; and (b1) if bits have not already been allocated to the signal block having the highest bit need $b_j$, then (i) allocating $a_1$ bits to $n_j$, where $n_j$ is a variable which denotes the $n_m$ bits allocated to each of the q samples of the signal block having the highest bit need $b_j$, to arrive at a value for $n_j$, (ii) subtracting $a_2$ from the highest bit need $b_j$ to arrive at a reduced value for $b_j$, and (iii) subtracting $a_1 \cdot q + x$ from B to arrive at a reduced value for B; or (b2) if bits have already been allocated to the signal block having the highest bit need $b_j$, then (i) allocating $c_1$ additional bits to $n_j$ to arrive at an increased value for $n_j$, (ii) subtracting $c_2$ from the highest bit need $b_j$ to arrive at a reduced value for $b_j$, and (iii) subtracting $c_1 \cdot q$ from B to arrive at a reduced value for B;

where x is an integer greater than unity corresponding to a number of bits necessary to represent a scale factor for the signal block having the highest bit need $b_j$; and $a_1$, $a_2$, $c_1$ and $c_2$ are numbers greater than zero, where $a_1$ is greater than $c_1$ and $a_2$ is greater than or equal to $c_2$.

37. The method as claimed in claim 35, further comprising preallocating a predetermined number of bits to at least one of the time-equivalent signal blocks prior to (a) allocating bits to the signal block having the bit need $b_m$ which is the highest and (b) reducing (i) the bit need $b_m$ for the signal block having the bit need $b_m$ which is the highest and (ii) the available number of bits B.

38. The method as claimed in claim 35, further comprising allocating a flag value to at least one of the time-equivalent signal blocks, which flag value indicates that no bits are to be allocated to that signal block.

39. The encoding system as claimed in claim 35, further comprising assembling into a frame of an output digital signal having successive frames the q samples from the time-equivalent signal blocks which have been quantized, scale factor information being included in the frame in the form of x-bit words representing scale factors associated with the time-equivalent signal blocks for which the q samples are included in the frame.

40. A bit allocation device for allocating bits to time-equivalent signal blocks of P subband signals, where P is an integer, each of the time-equivalent signal blocks having q samples, where q is a positive integer, the device comprising:
    means for receiving a bit need $b_m$ for each of the time-equivalent signal blocks, where $b_m$ is a variable which may vary for the time-equivalent signal blocks and m is a positive integer denoting which one of the subband signals a time-equivalent signal block comes from, the bit need $b_m$ for a time-equivalent signal block corresponding to the number of bits by which the q samples in that time-equivalent signal block should be represented; and
    bit allocation means for allocating, from an available number of bits B, where B is a positive integer, $n_m$ bits to each of the q samples of each of the time-equivalent signal blocks in accordance with the bit need $b_m$ for each of the time-equivalent signal blocks, said bit allocation means being adapted to at least twice:
        (a) allocate to the time-equivalent signal block having the bit need $b_m$ which is highest (i) a first number of bits if bits have not already been allocated to that time-equivalent signal block or (ii) an additional second number of bits if bits have already been allocated to that time-equivalent signal block, where the first number is greater than the second number, and
        (b) reduce (i) the bit need $b_m$ for the time-equivalent signal block having the bit need $b_m$ which is highest and (ii) the available number of bits B.

41. The device as claimed in claim 40, wherein said bit allocation means is further adapted to preallocate a predetermined number of bits to at least one of the time-equivalent signal blocks prior to (a) allocating bits to the time-equivalent signal block having the bit need $b_m$ which is highest and (b) reducing (i) the bit need $b_m$ for the time-equivalent signal block having the $b_m$ which is highest and (ii) the available number of bits B.

42. The device as claimed in claim 40, wherein said bit allocation means is further adapted for allocating a flag value to at least one of the time-equivalent signal blocks, which flag value indicates that no bits are to be allocated to that time-equivalent signal block.

43. A transmitter comprising the device as claimed in claim 40.

44. The device as claimed in claim 40, wherein said bit allocation means is adapted to perform the following operations in a routine $S_1$:
    (a) determine which time-equivalent signal block has a highest bit need $b_j$, where $b_j$ is a variable which denotes the bit need $b_m$ for that time-equivalent signal block and j is an integer which denotes the same subband signal which m denotes for that time-equivalent signal block; and
    (b1) if bits have not already been allocated to the time-equivalent signal block having the highest bit need $b_j$, then
        (i) allocate $a_1$ bits to $n_j$, where $n_j$ is a variable which denotes the $n_m$ bits allocated to each of the q samples of the time-equivalent signal block having the highest bit need $b_j$, to arrive at a value for $n_j$,
        (ii) subtract $a_2$ from the highest bit need $b_j$ to arrive at a reduced value for $b_j$, and
        (iii) subtract $a_1 \cdot q + x$ from B to arrive at a reduced value for B; or
    (b2) if bits have already been allocated to the time-equivalent signal block having the highest bit need $b_j$, then
        (i) allocating $c_1$ additional bits to $n_j$ to arrive at an increased value for $n_j$,
        (ii) subtract $c_2$ from the highest bit need $b_j$ to arrive at a reduced value for $b_j$, and
        (iii) subtract $c_1 \cdot q$ from B to arrive at a reduced value for B;
where x is an integer greater than unity corresponding to a number of bits necessary to represent a scale factor for the time-equivalent signal block having the highest bit need $b_j$; and $a_1$, $a_2$, $c_1$ and $c_2$ are numbers greater than zero, where $a_1$ is greater than $c_1$ and $a_2$ is greater than or equal to $c_2$.

45. The device as claimed in claim 44, wherein $a_1$ is equal to $a_2$ and $c_1$ is equal to $c_2$.

46. The device as claimed in claim 44, wherein said bit allocation means is further adapted for repeating the operations of routine $S_1$ continuously until B has been reduced below $c_1 \cdot q$.

47. The device as claimed in claim 44, wherein said bit allocation means is further adapted for repeating the operations of routine $S_1$ continuously until either B has been reduced below $c_1 \cdot q$ or the bit need $b_m$ for each of the time-equivalent signal blocks becomes less than or equal to a flag value.

48. The device as claimed in claim 47 wherein $A_{k0}$ is equal to $a_1$ and $A_{k1}$ is equal to $a_2$.

49. The device as claimed in claim 44, wherein said bit allocation means is further adapted to perform the following operations for at least one of the time-equivalent signal blocks prior to performance of the operations of the routine $S_1$:
    subtracting $A_{k1}$ from $b_k$, where $b_k$ is a variable which denotes the bit need $b_m$ for that at least one time-equivalent signal block and k is an integer which denotes the same subband signal which m denotes for that at least one time-equivalent signal block, to arrive at a reduced value for $b_k$;
    allocating $A_{k0}$ bits to $n_k$, were $n_k$ is a variable which denotes the $n_m$ bits allocated to each of the q samples of that at least one time-equivalent signal block, to arrive at a value for $n_k$; and subtracting $A_{k0} \cdot q + x$ from B to arrive at a reduced value for B;

where $A_{k0}$ and $A_{k1}$ are numbers greater than zero.

50. A method for allocating bits to time-equivalent signal blocks of P subband signals, where P is an integer, each of the time-equivalent signal blocks having q samples, where q is a positive integer, the method comprising:

receiving a bit need $b_m$ for each of the time-equivalent signal blocks, where $b_m$ is a variable which may vary for the time-equivalent signal blocks and m is a positive integer denoting which one of the subband signals a time-equivalent signal block comes from, the bit need $b_m$ for a time-equivalent signal block corresponding to the number of bits by which the q samples in that time-equivalent signal block should be represented; and allocating, from an available number of bits B, where B is a positive integer, $n_m$ bits to each of the q samples of each of the time-equivalent signal blocks in accordance with the bit need $b_m$ for each of the time-equivalent signal blocks by at least twice:

(a) allocating to the time-equivalent signal block having the bit need $b_m$ which is highest (i) a first number of bits if bits have not already been allocated to that time-equivalent signal block or (ii) an additional second number of bits if bits already been allocated to that time-equivalent signal block, where the first number is greater than the second number, and (b) reducing (i) the bit need $b_m$ for the time-equivalent signal block having the bit need $b_m$ which is highest and (ii) the available number of bits B.

51. The method as in claim 50, further comprising preallocating a predetermined number of bits to at least one of the time-equivalent signal blocks prior to (a) allocating bits to the time-equivalent signal block having the bit need $b_m$ which is highest and (b) reducing (i) the bit need $b_m$ for the time-equivalent signal block having the $b_m$ which is highest and (ii) the available number of bits B.

52. The method as claimed in claim 50, further comprising allocating a flag value to at least one of the time-equivalent signal blocks, which flag value indicates that no bits are to be allocated to that time-equivalent signal block.

53. The method as claimed in claim 50, wherein allocating the $n_m$ bits to each of the q samples of each of the time-equivalent signal blocks includes performing the following operations of in a routine $S_1$:

(a) determining which time-equivalent signal block has a highest bit need $b_j$, where $b_j$ is a variable which denotes the bit need $b_m$ for that time-equivalent signal block and j is an integer which denotes the same subband signal which m denotes for that time-equivalent signal block; and (b1) if bits have not already been allocated to the time-equivalent signal block having the highest bit need $b_j$, then (i) allocating $a_1$ bits to $n_j$, where $n_j$ is a variable which denotes the $n_m$ bits allocated to each of the q samples of the time-equivalent signal block having the highest bit need $b_j$, to arrive at a value for $n_j$, (ii) subtracting $a_2$ from the highest bit need $b_j$ to arrive at a reduced value for $b_j$, and (iii) subtracting $a_1 \cdot q + x$ from B to arrive at a reduced value for B; or (b2) if bits have already been allocated to the time-equivalent signal block having the highest bit need $b_j$, then (i) allocating $c_1$ additional bits to $n_j$ to arrive at an increased value for $n_j$, (ii) subtracting $c_2$ from the highest bit need $b_j$ to arrive at a reduced value for $b_j$, and (iii) subtracting $c_1 \cdot q$ from B to arrive at a reduced value for B;

where x is an integer greater than unity corresponding to a number of bits necessary to represent a scale factor for the time-equivalent signal block having the highest bit need $b_j$; and $a_1$, $a_2$, $c_1$ and $c_2$ are numbers greater than zero, where $a_1$ is greater than $c_1$ and $a_2$ is greater than or equal to $c_2$.

54. The method as claimed in claim 53, wherein $a_1$ is equal to $a_2$ and $c_1$ is equal to $c_2$.

55. The method as claimed in claim 53, wherein the operations of the routine $S_1$ are continuously repeated until B has been reduced below $c_1 \cdot q$.

56. The method as claimed in claim 53, wherein the operations of the routine $S_1$ are continuously repeated until either B has been reduced below $c_1 \cdot q$ or the bit need $b_m$ for each of the time-equivalent signal blocks becomes less than or equal to a flag value.

57. The method as claimed in claim 56, wherein $A_{k0}$ is equal to $a_1$ and $A_{k1}$ is equal to $a_2$.

58. The method as claimed in claim 53, wherein the following operations are performed for at least one of the time-equivalent signal blocks prior to performing the operations of the routine $S_1$:

subtracting $A_{k1}$ from $b_k$, where $b_k$ is a variable which denotes the bit need $b_m$ for that at least one time-equivalent signal block and k is an integer which denotes the same subband signal which m denotes for that at least one time-equivalent signal block, to arrive at a reduced value for $b_k$;

allocating $A_{k0}$ bits to $n_k$, were $n_k$ is a variable which denotes the $n_m$ bits allocated to each of the q samples of that at least one time-equivalent signal block, to arrive at a value for $n_k$; and subtracting $A_{k0} \cdot q + x$ from B to arrive at a reduced value for B;

where $A_{k0}$ and $A_{k1}$ are numbers greater than zero.

* * * * *

UNITED STATES PATENT AND TRADEMARK OFFICE
CERTIFICATE OF CORRECTION

PATENT NO. : 5,367,608
DATED : 11-22-94
INVENTOR(S) : Raymond N.J. Veldhuis, et. al.

It is certified that error appears in the above-identified patent and that said Letters Patent is hereby corrected as shown below:

| | | | |
|---|---|---|---|
| Column 5, | line 7, | | delete "each of"; |
| | line 12, | | after "which" insert --each of--. |
| Column 17, | Claim 3, | line 51, | after "2" insert --,-- (comma); |
| | Claim 5, | line 60, | delete "characterized"; |
| Column 19, | Claim 17, | line 12, | change "(b2)" to --(b1)--; |
| | Claim 18, | line 38, | after "17" insert --,-- (comma); |
| | | line 41, | after "blocks" insert --:-- (colon); |
| | Claim 22, | line 64, | delete "said"; |
| Column 23, | Claim 39, | line 17, | change "encoding system" to --method--; |
| Column 24, | Claim 44, | line 30, | change "allocating" to --allocate--; |
| | Claim 49, | line 61, | change "subtracting" to --subtract--; |
| | | line 67, | change "allocating" to --allocate--; |

UNITED STATES PATENT AND TRADEMARK OFFICE
CERTIFICATE OF CORRECTION

PATENT NO. : 5,367,608
DATED : 11-22-94
INVENTOR(S) : Raymond N.J. Veldhuis, et. al.

It is certified that error appears in the above-identified patent and that said Letters Patent is hereby corrected as shown below:

Column 25,    Claim 49, line 3,    change "subtracting" to --subtract--;

Claim 50, line 31,    after "bits" insert --have--;

Claim 53, line 55,    delete "of".

Signed and Sealed this

Twenty-sixth Day of March, 1996

*Attest:*

BRUCE LEHMAN

*Attesting Officer*     *Commissioner of Patents and Trademarks*